(12) United States Patent  (10) Patent No.: US 7,734,910 B2
Nasu  (45) Date of Patent: Jun. 8, 2010

(54) MANAGED DEVICE, MANAGEMENT SYSTEM, METHOD FOR CONTROLLING A MANAGED DEVICE AND MEDIUM

(75) Inventor: Masami Nasu, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1097 days.

(21) Appl. No.: 11/350,144

(22) Filed: Feb. 9, 2006

(65) Prior Publication Data

US 2006/0182042 A1 Aug. 17, 2006

(30) Foreign Application Priority Data

Feb. 16, 2005 (JP) ............................. 2005-038883
Dec. 23, 2005 (JP) ............................. 2005-371139

(51) Int. Cl.
*H04L 29/02* (2006.01)
*H04L 29/04* (2006.01)
*H04L 9/32* (2006.01)
*G06F 15/16* (2006.01)
*G06F 9/00* (2006.01)

(52) U.S. Cl. ............................ 713/155; 713/156; 726/4; 726/5; 726/12

(58) Field of Classification Search .................. 713/150, 713/155, 156; 370/254; 709/223, 225; 726/4, 726/5, 12
See application file for complete search history.

(56) References Cited

U.S. PATENT DOCUMENTS

2003/0161473 A1* 8/2003 Fransdonk ................... 380/277
2003/0191935 A1* 10/2003 Ferguson ..................... 713/153

* cited by examiner

*Primary Examiner*—Ponnoreay Pich
*Assistant Examiner*—Sayed Beheshti Shirazi
(74) *Attorney, Agent, or Firm*—Oblon, Spivak, McClelland, Maier & Neustadt, L.L.P.

(57) ABSTRACT

A managed device obtains an individual certificate with an ID of the managed device when the managed device is in a direct-managed state and determines that the certificate set as the certifying information for communicating with a managing device is a common certificate without an ID of the managed device.

18 Claims, 29 Drawing Sheets

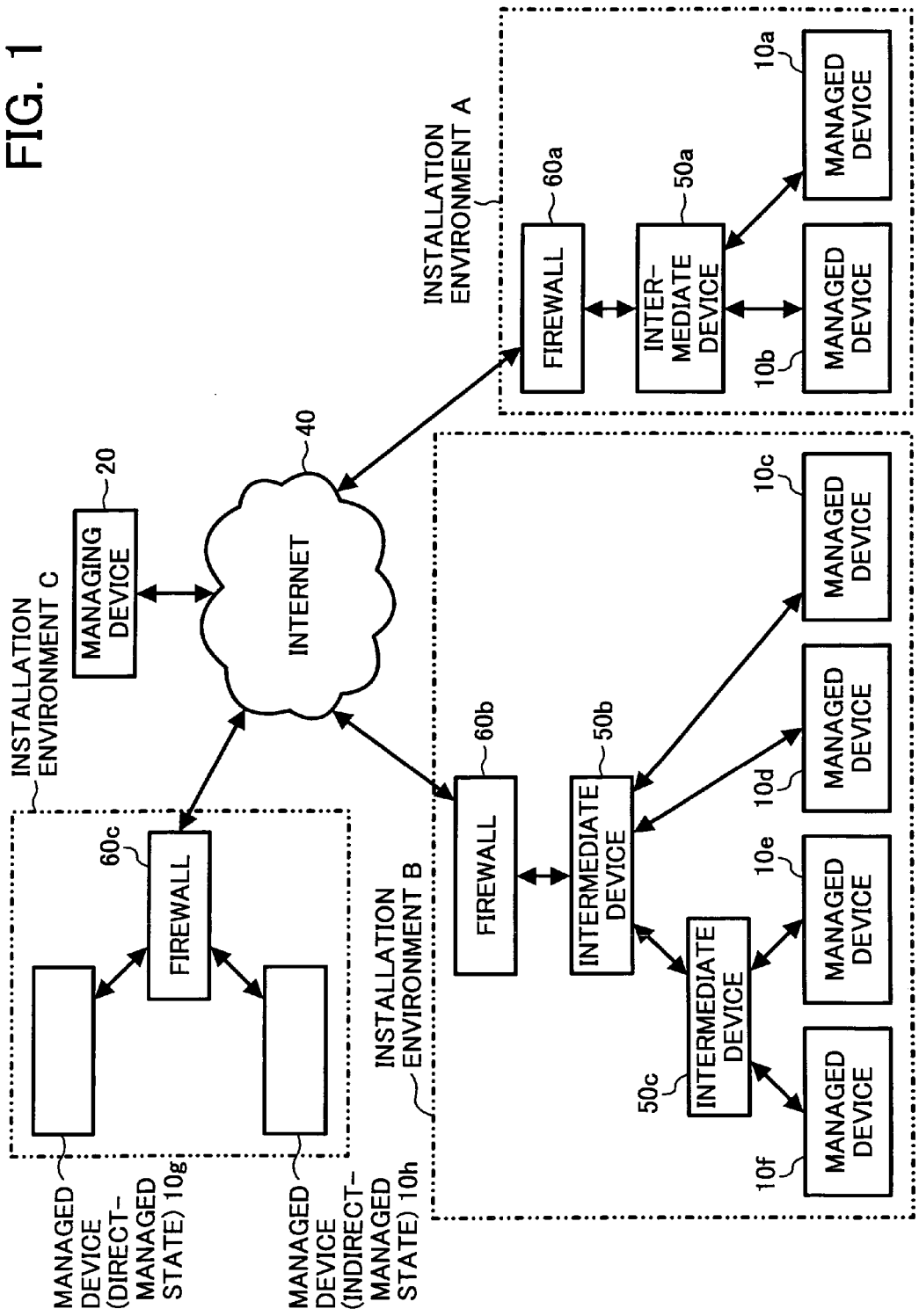

FIG. 11

INSTALLATION OPERATION — 214

☐ REGISTRATION                    ☐ BACK — 210

- STATE            : NOT REGISTERED — 212
- REGISTRATION
  NUMBER          : [         ]
                                        213

INSTALLATION OPERATION — 221

☐ OK — 220

- STATE            : REGISTERED
- REGISTRATION
  NUMBER          : xxxxxxx

FIG. 13

INSTALLATION OPERATION — 231

☐ OK — 230

- STATE            : REGISTERED
- REGISTRATION
  NUMBER          : xxxxxxx

CERTIFICATE FOR DIRECT COMMUNICATION
IS NOT SET. IT WILL BE ATTEMPTED TO
OBTAIN IT WHEN TURNS ON NEXT TIME.

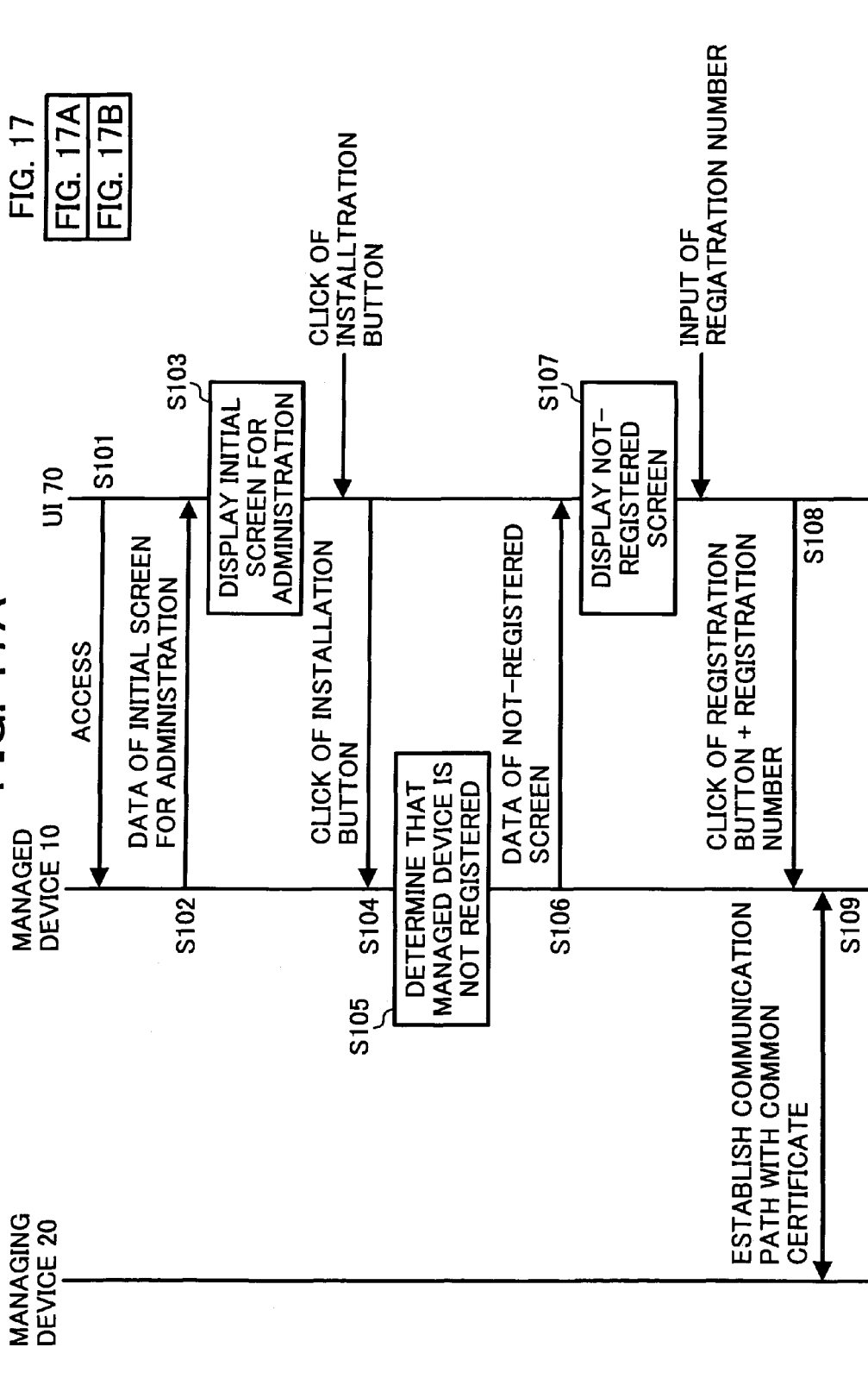

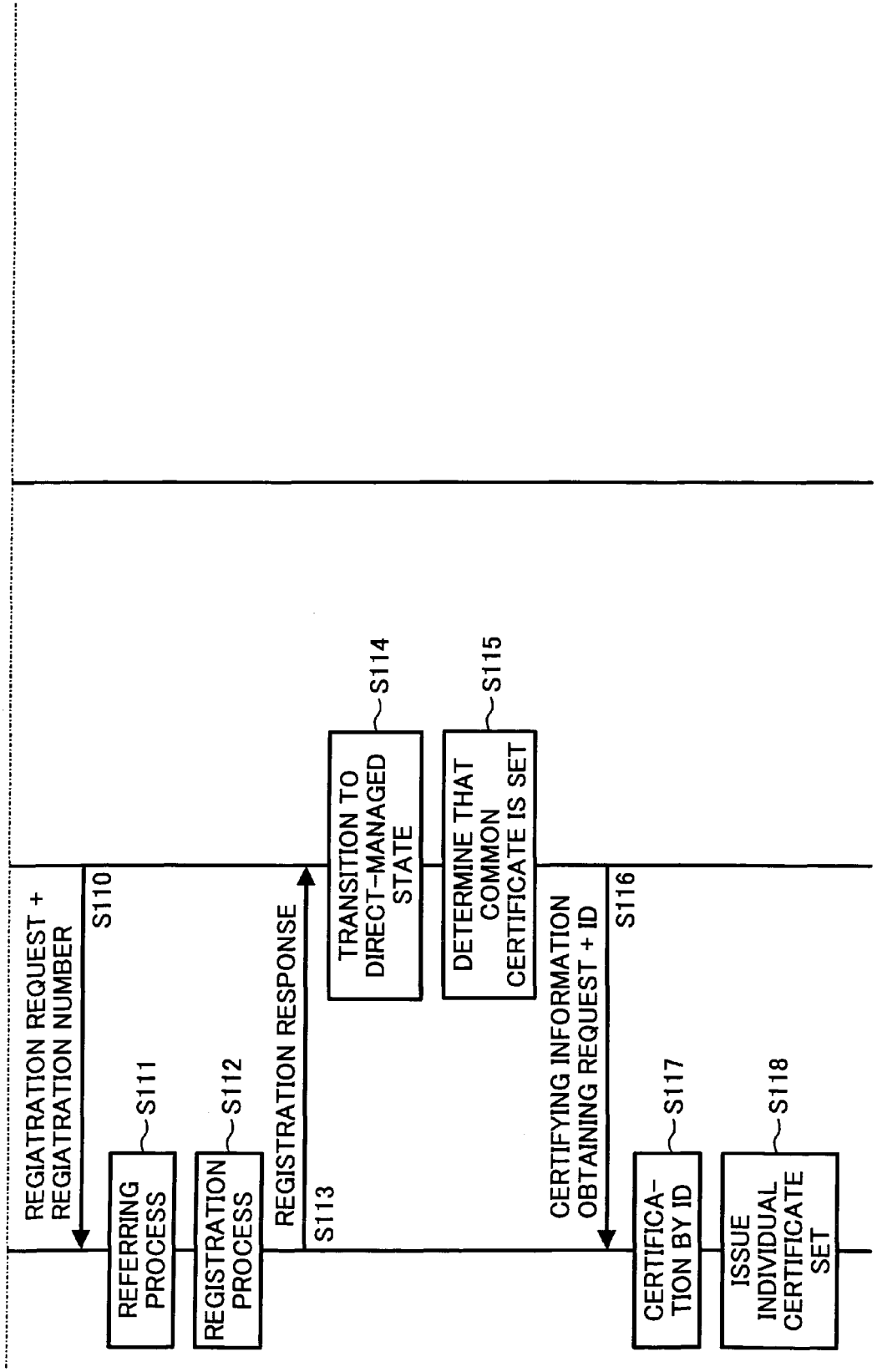

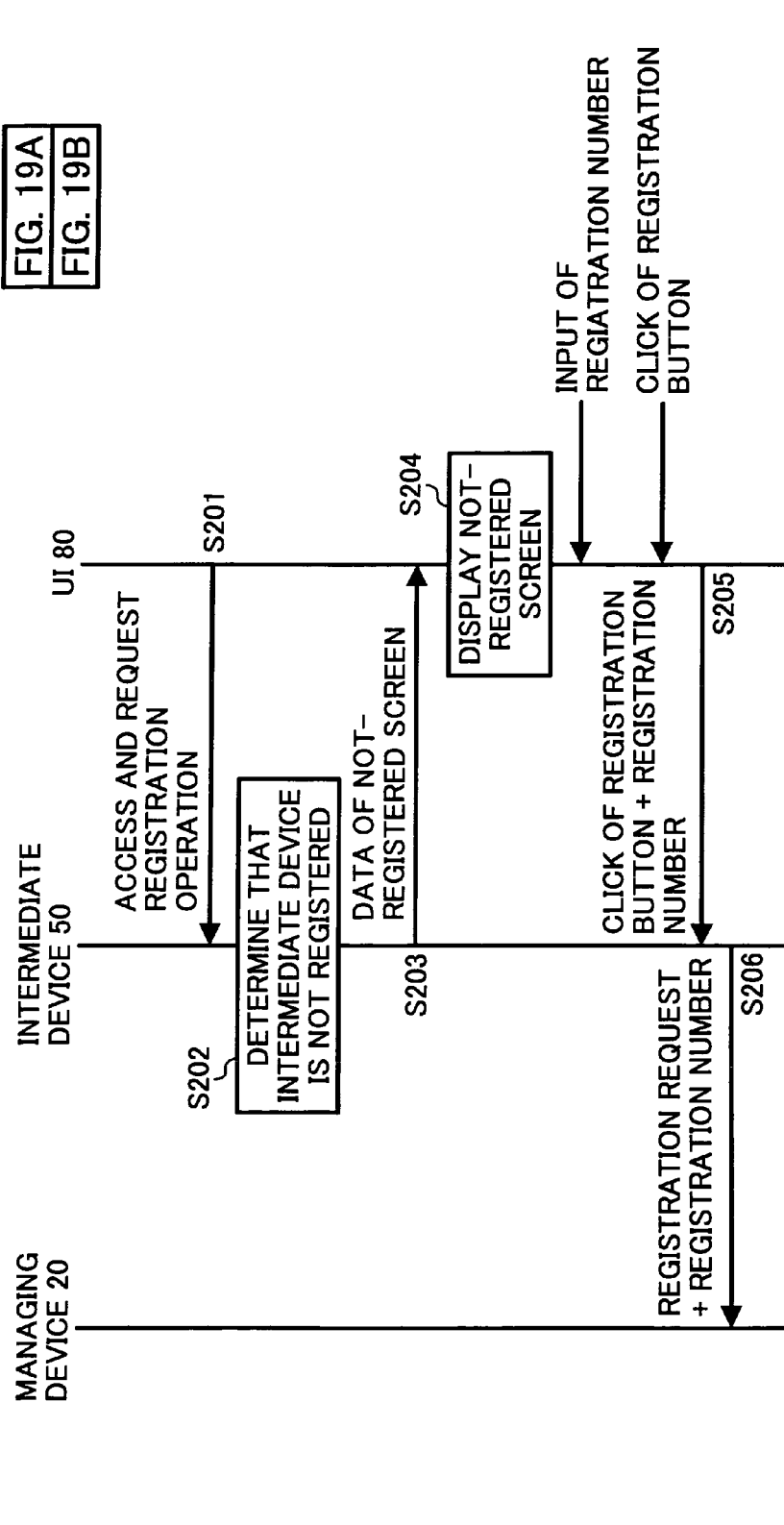

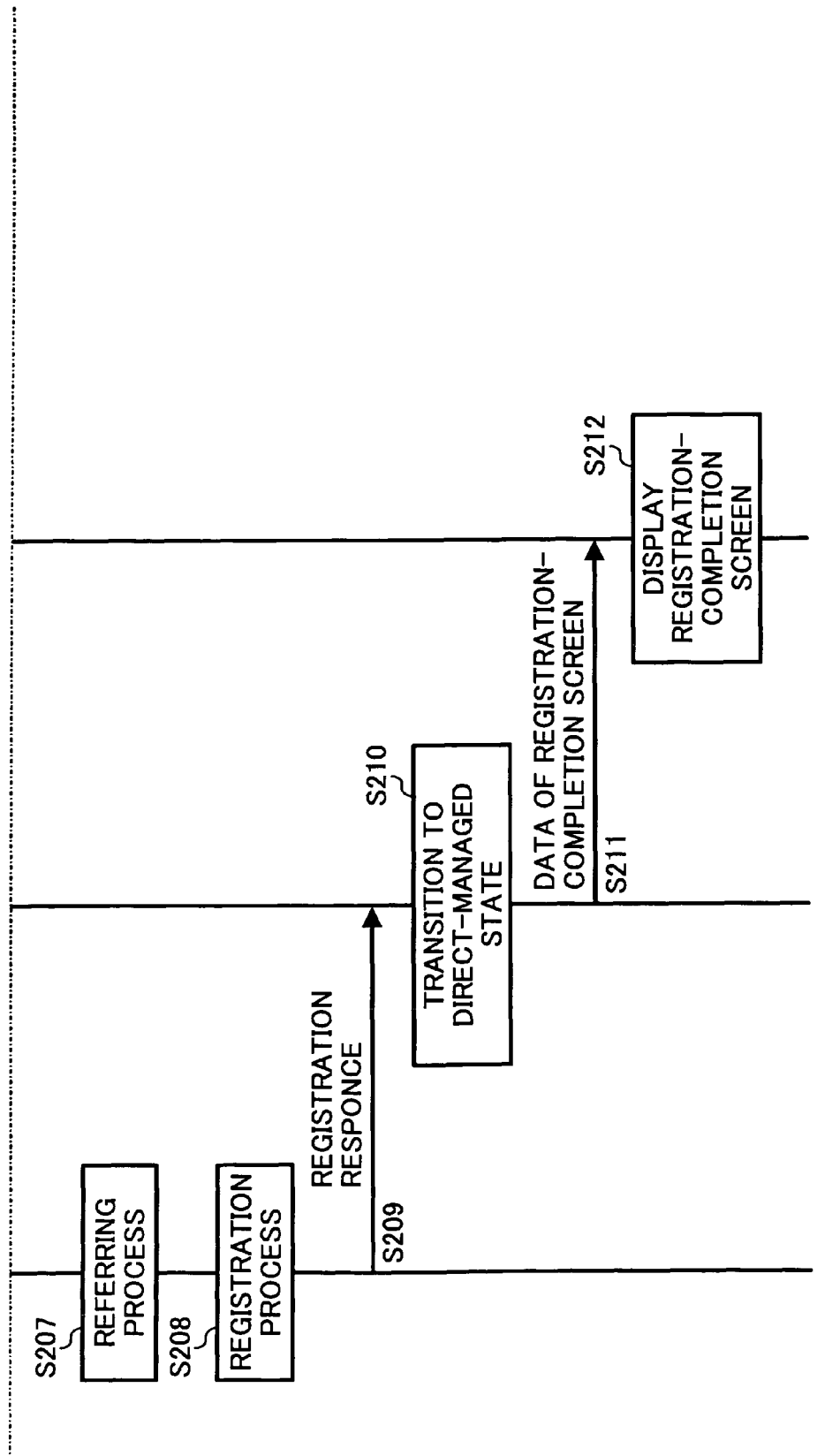

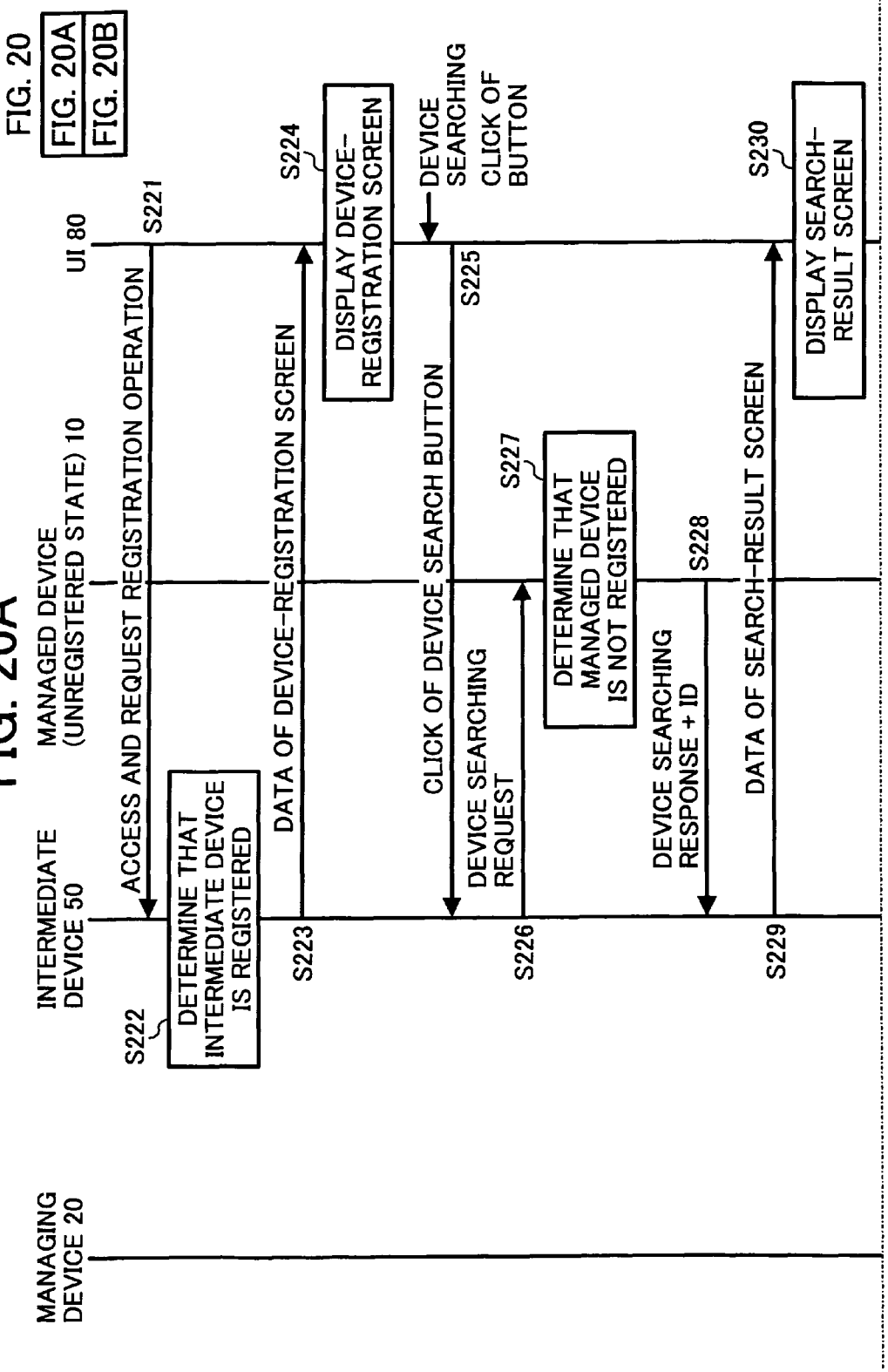

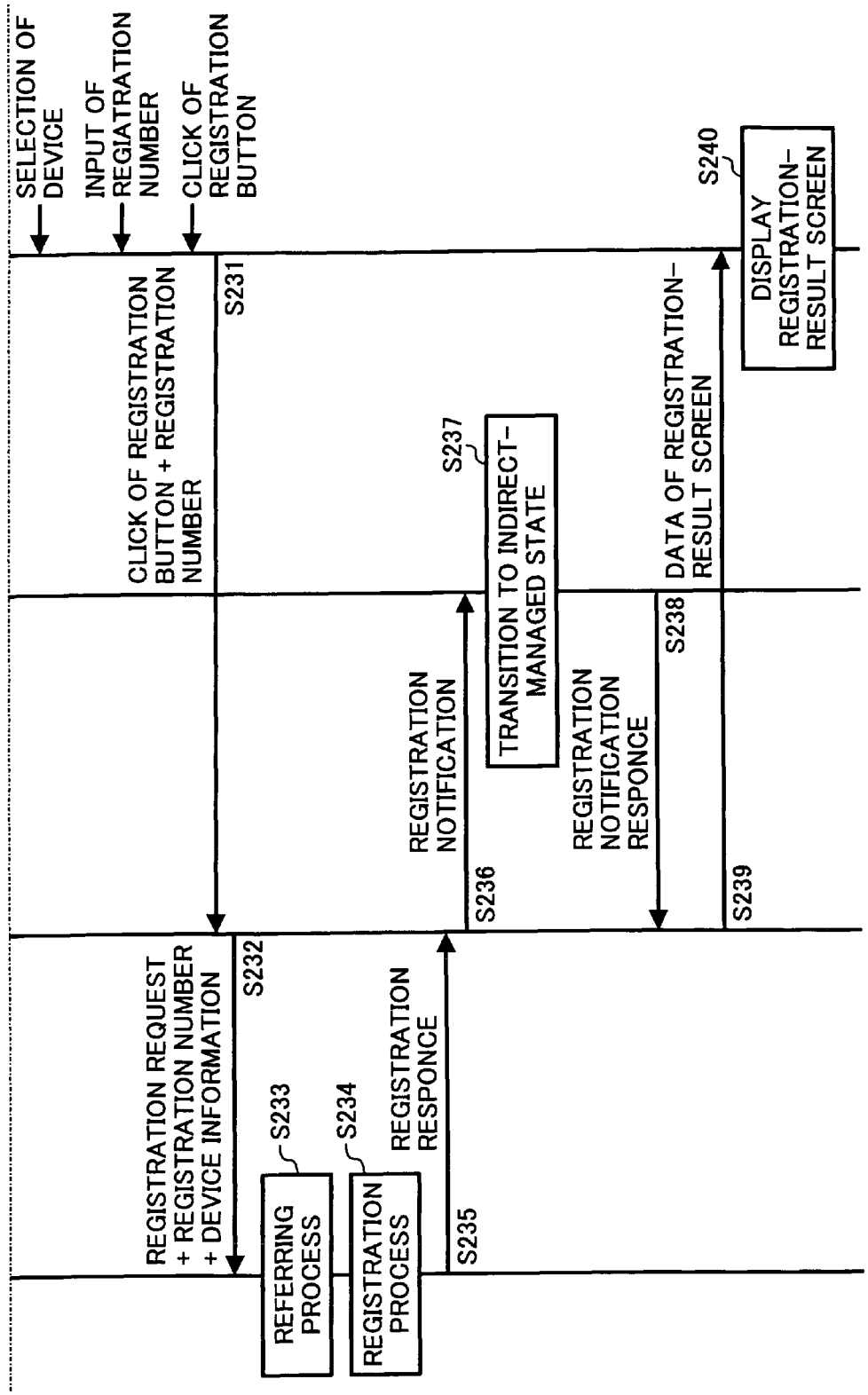

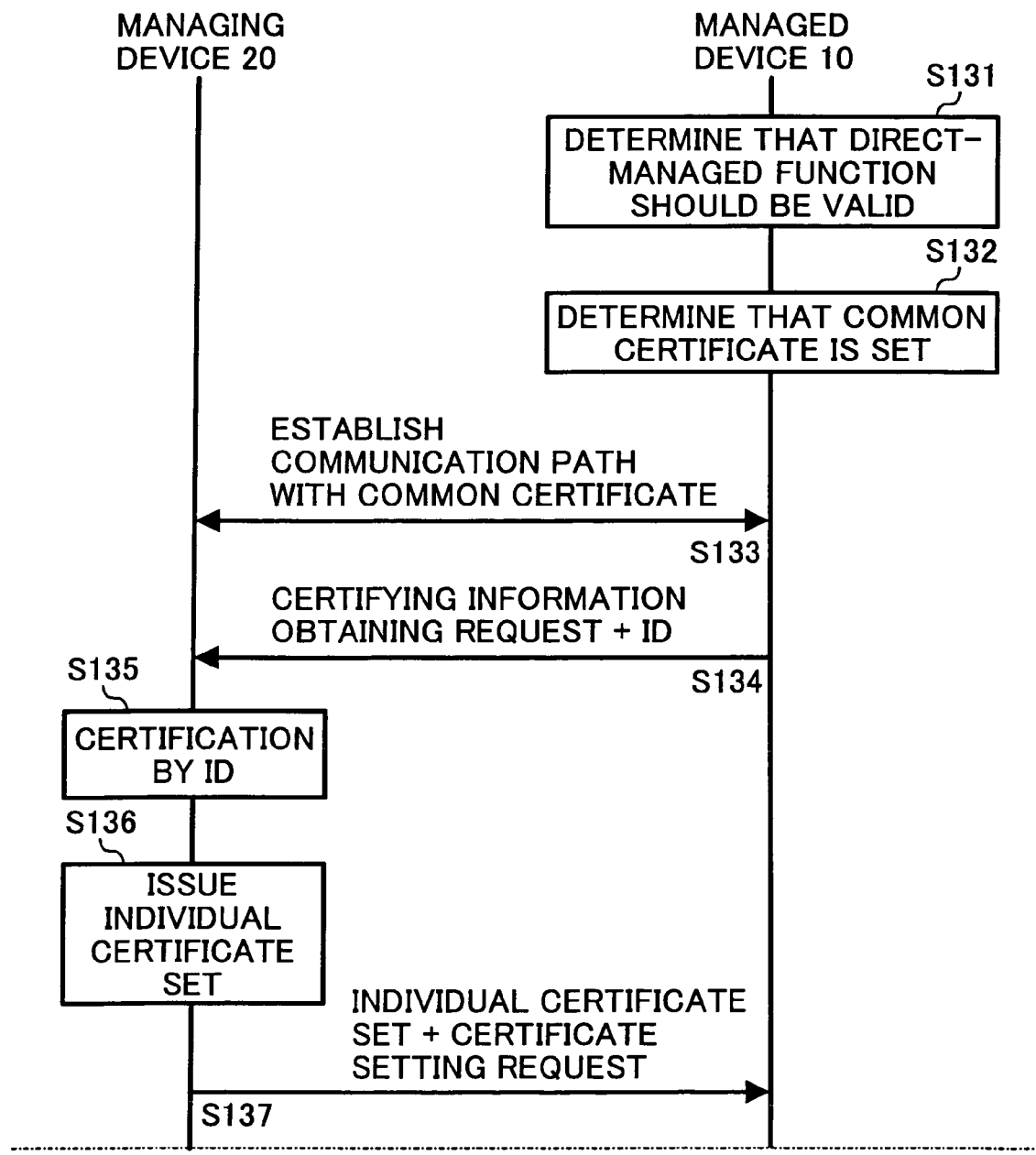

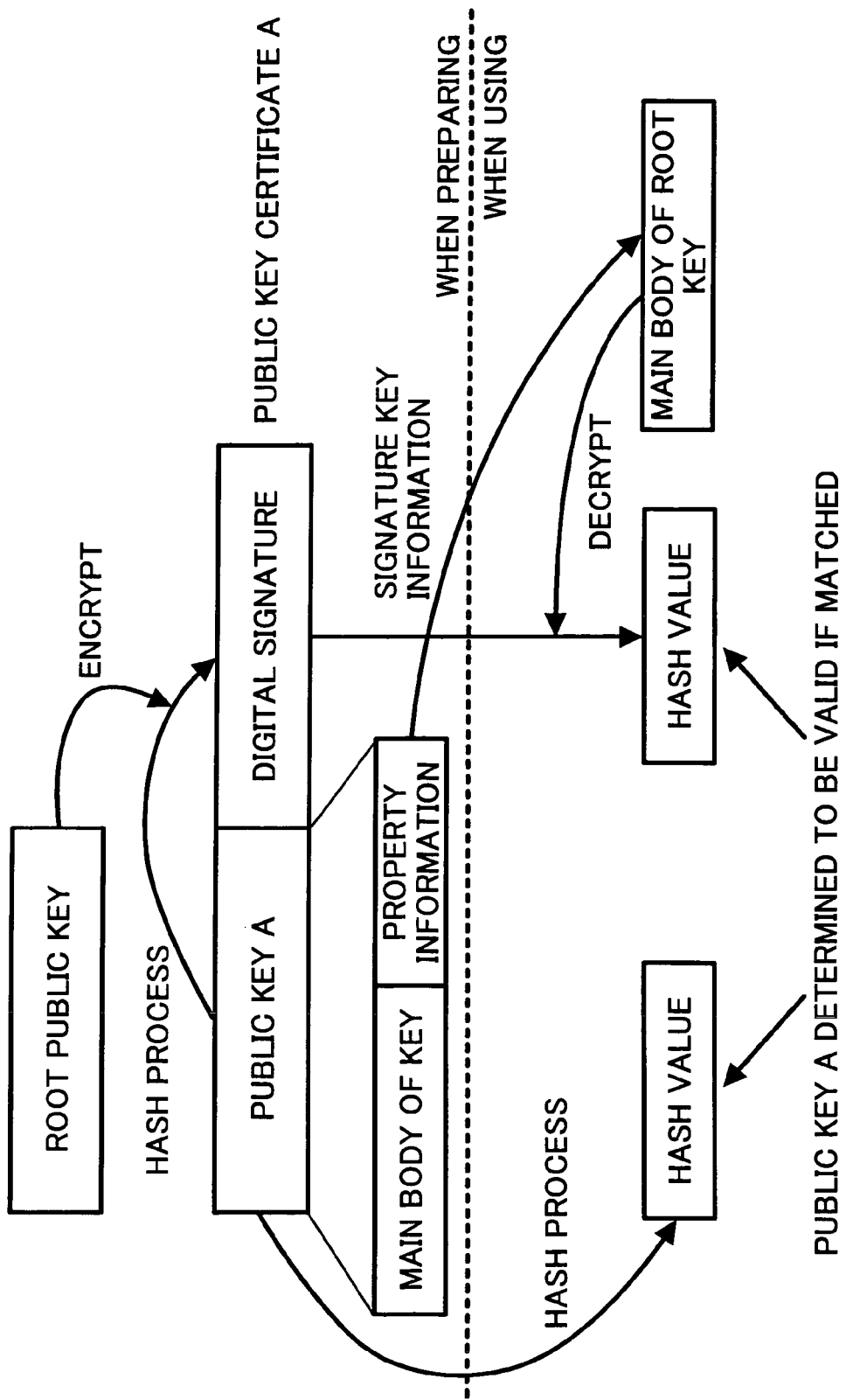

MANAGED DEVICE, MANAGEMENT SYSTEM, METHOD FOR CONTROLLING A MANAGED DEVICE AND MEDIUM

BACKGROUND OF THE INVENTION

1. Field of the Invention

The present invention generally relates to a managed device, a management system, a method for controlling a managed device, and a medium containing a program to control a managed device.

2. Description of the Related Art

A managed device connects multiple electronic apparatuses, each having its own communication function such as a client function or a server function, via a communication line, and various management systems can be built using such managed devices.

In building a management system, it is important to confirm when communicating whether a communication counterpart is appropriate, or whether information being transmitted has not been tampered with. Moreover, especially when communicating over the Internet, as information often passes through computers that are unrelated before reaching the communication destination, when transmitting secret information, there is also a demand for making sure that the contents are not viewed secretly. A protocol such as SSL (Secure Sockets Layer), for example, as a communication protocol to respond to such a demand is being developed and widely used. Using this protocol to communicate combines public key encrypting methods and common-key encrypting methods for authenticating the communication counterpart as well as preventing tampering and tapping by encrypting information. Moreover, even at the communication destination side, a communication originating apparatus that requests communications is authenticated.

Technologies related to authentication using such SSL and public key encrypting are described in Patent Document 1, JP2002-353959A, and Patent Document 2, JP2002-251492A.

Now, a communication procedure for mutually authenticating according to this SSL is described focusing on the authentication process portion. FIG. 28 is a diagram illustrating a flow of processes executed in each apparatus when communication apparatuses A and B mutually authenticate according to the SSL, along with information used for the process.

As illustrated in FIG. 28, when mutually authenticating according to the SSL, there is a need to first have a root key certificate, a private key, and a public key certificate stored in both of the communication apparatuses. This private key is a private key issued to each apparatus by a CA (Certificate Authority), while the public key certificate is one such that the public key corresponding to the private key is appended with a digital signature by the CA so as to be set as a digital certificate. Moreover, the root key certificate is one such that a root key corresponding to a root private key used in the digital signature is appended with a digital signature so as to be set as a digital certificate.

FIG. 29A and FIG. 29B illustrate these relationships.

As illustrated in FIG. 29A, a public key A is configured from a main body of the key for decrypting text encrypted using a private key A, and property information that includes such information as the issuer (CA) of the public key and validity. Then, to indicate that the main body of the key and the property information are not tampered with, a hash value obtained by hashing the public key A is encrypted using a root private key so as to be applied to a client common key as a digital signature. Moreover, at that time, information identifying the root private key used in the digital signature is added as signature key information to the bibliographical information of the public key A. Then, the public key certificate having this digital signature applied is a pubic-key certificate A.

When using this public-key certificate A for authenticating, the digital signature contained therein is decrypted using a main body of a root key being a public key corresponding to the root-private key. It is understood when this decrypting is performed successfully that the digital signature is certainly applied by the communication apparatus. Moreover, it is understood that when the hash value obtained by hashing the public key A portion and a hash value obtained by decrypting matches that the key itself is also neither damaged nor tampered with. Furthermore, it is understood that when it is possible to successfully decrypt the received data using this public key A that the data is transmitted from the owner of the private key A.

Now, while it is necessary to store in advance a root key for performing authentication, as illustrated in FIG. 29B, this root key is stored as a root key certificate having applied a digital signature by the communication apparatus. This root key certificate is in a self signature format enabled to decrypt the digital signature with a public key contained therein. Then, when using the root key, the main body of the key contained in the root key certificate is used to decrypt the digital signature so as to compare with the hash value obtained by hashing the root key. When there is a match, it is possible to confirm that the root key is not corrupted, for instance.

Now the flowcharts in FIG. 28 (FIGS. 28A, 28B) are described. It is noted that in this diagram, an arrow between the two flow charts represents transferring of data such that the transmitting side performs a transferring process at a step from which the arrow originates, while the receiving side, once the information is received, performs a process of a step to which the arrow points. Moreover, when a process of each of the steps is not successfully completed, at that time a response of having failed authentication is returned so as to suspend the process. The same holds when a response of having failed authentication is received from the counterpart, or upon time out of the process.

Now, with a communication apparatus A requesting communications with a communication apparatus B, when performing this request, the CPU of the communication apparatus A executes a required control program and starts a process of the flowchart illustrated on the left-hand side of FIG. 28A. Then, in step S311, a request for connection is transmitted to the communication apparatus B.

On the other hand, the CPU of the communication apparatus B, once receiving this request for connection, executes a required control program and starts a process of the flowchart illustrated on the right-hand side of FIG. 28A. Then, in step S321 a first random number is generated for encrypting using a private key B. Then, in step S322, the encrypted first random number and a public key certificate B are transmitted to the communication apparatus A.

At the communication apparatus A side, when receiving this information, in step S312 the validity of the public key certificate B is confirmed using a root key certificate.

Then once confirmed, in step S313 the first random number is decrypted using a public key B contained in the received public key certificate B. When the decrypting here is successful, that confirms that the first random number is certainly received from a subject to which the public key certificate is issued. Then, when the confirming as described above is successful, information indicating success of authentication is transmitted to the communication apparatus B.

Moreover, at the communication apparatus B side, upon receiving this information, in step S323, transmission of a public key certificate for authentication is requested from (request sent to) the communication apparatus A.

Then, at the communication apparatus A, based on the above request for transmission, in step S314, a second random number and a common key seed are generated. A common key seed may be generated based on data transacted in previous communications, for example. Then, in step S315 the second random number is encrypted using a private key A, the common key seed is encrypted using the public key B, and in step S316 these are transmitted with a public key certificate A to the communication apparatus B side. Encrypting the common key seed is performed for the purpose of making sure that the random number is not known to apparatuses other than the communications counterpart.

Then, in the next step S317, a common key for use in encrypting subsequent communications is generated from the common key seed generated in step S314.

At the communication apparatus B side, when receiving the noted information, in step S324 the validity of the public key certificate A is confirmed using the root key certificate. Then once confirmed, in step S325, the second random number is decrypted using a public key A contained in the public key certificate A received. When the decrypting here is successful, that confirms that the second random number is certainly received from a subject to which the public key certificate A is issued.

Subsequently, in step S326 the common-key seed is decrypted using a private key B. It can be said that, in the process thus far, the first through the third common key seeds common to the communication apparatus A side and the communication apparatus B side are shared. Then, at least the common key seed does not become known to apparatuses other than the communication apparatus A having generated the number and the communication apparatus B having the private key B. Once the process described thus far succeeds, also at the communication apparatus B side in step S327 a common key for use in encrypting subsequent communications is generated from the common key seed obtained by decrypting.

Then, once the process of step S317 at the communication apparatus A side and the process of step S327 at the communication apparatus B side are terminated, success of authentication and an encrypting method for use in subsequent communications are mutually confirmed for terminating the process regarding authentication assuming that the generated common key is used to conduct the subsequent communications using the encrypting method confirmed as described above. It is noted that the confirming as described above includes a response from the communication apparatus B that authentication has succeeded. The process as described above enables mutually establishing communications so as to subsequently use the common key generated in step S317 or step S327 and to encrypt data according to the common key encrypting method for conducting communications.

Performing such a process as described above enables securely sharing a common key upon the communication apparatus A and communication apparatus B mutually authenticating their counterparts, and establishing a path for communicating securely.

It is noted that in the process as described above, it is not mandatory to encrypt the second random number with the private key A and to transmit the public key certificate A to the communication apparatus B. In this way, the process of steps S323 and S324 at the communication apparatus B side is not required. In this way, while it is not possible for the communication apparatus B to authenticate the communication apparatus A, this process is sufficient when it suffices for the communication apparatus A to only authenticate the communication apparatus B. Then in this case, it is necessary to have only the root key certificate stored in the communication apparatus A so that neither the private key A nor the public key certificate A are needed. Moreover, it is not necessary to have the root key certificate stored in the communication apparatus B.

SUMMARY OF THE INVENTION

According to one aspect of the present invention, novel managed devices, management systems, methods for controlling a managed device, and a medium are provided in which the above-mentioned problems are addressed.

According to another aspect of the present invention, an information processing apparatus, a method for setting image processing functions, a program that sets image processing functions, and a medium are provided, in which it is possible to make it simple for a user operation in registering a preset setting for a plurality of print functions with a name of it.

For example, this disclosure provides a managed device including: a managed part (1) being directly managed by a managing device via a communication line or (2) being indirectly managed by the managing device via a communication line and an intermediate device; and an individual certificate obtaining part obtaining an individual certificate with an ID of the managed device when the managed device in a state of a valid direct management determines that a certificate set for communicating with the managing device is a common certificate without the ID of the managed device.

In the managed device the managed part may include, when being directly managed, a part to be certified by the managing device and be managed by the managing device by communicating with the managing device; and the managed part may include, when being indirectly managed, a part to be certified by the intermediate device and be managed by the managing device by communicating with the managing device via the intermediate device.

Moreover, the managed device may include: a setting part setting the individual certificate obtained by the individual certificate obtaining part as the certificate for communicating with the managing device.

Furthermore, in the managed device, the individual certificate obtaining part may obtain the individual certificate via a connection over the communication line established by the common certificate.

Moreover, in the managed device, the individual certificate obtaining part may include a part to send the ID of the managed device to the managing device in obtaining the individual certificate.

Furthermore, the managed device may include a determining part determining an error in a case that the ID sent to the managing device by the individual certificate obtaining part does not correspond to the ID in the individual certificate obtained by the individual certificate obtaining part.

In the managed device, the individual certificate obtaining part may include a part to obtain the individual certificate in a case that the managed device receives a response that the managing device registers the managed device as a managing object by the direct managed part.

Moreover, in the managed device, the managed part may not be validated for direct management while the managed part is valid for indirect management.

Furthermore, the disclosure provides a management system including: a managing device; a managed device including a managed part (1) being directly managed by a managing device via a communication line, or (2) being indirectly managed by the managing device via a communication line and an intermediate device; and an individual certificate obtaining part obtaining an individual certificate with an ID of the managed device when the managed device in a state of valid direct management determines that a certificate set for communicating with the managing device is a common certificate without the ID of the managed device.

In the management system, the managed part may include, when being directly managed, a part to be certified by the managing device and be managed by the managing device by communicating with the managing device; and the managed part may include, when being indirectly managed, a part to be certified by the intermediate device and be managed by the managing device by communicating with the managing device via the intermediate device.

Moreover, in the management system, the managed device may include a setting part setting the individual certificate obtained by the individual certificate obtaining part as the certificate for communicating with the managing device.

Furthermore, in the management system, the individual certificate obtaining part may obtain the individual certificate via a connection over the communication line established by the common certificate.

Moreover, in the management system, the individual certificate obtaining part may include a part to send the ID of the managed device to the managing device in obtaining the individual certificate.

Furthermore, in the management system, the managing device may include a sending part to send the individual certificate in a case that a certification of the ID sent by the managed device succeeds.

Moreover, in the management system, the managed device may include a determining part determining an error in a case that the ID sent to the managing device by the individual certificate obtaining part does not correspond to the ID in the individual certificate obtained by the individual certificate obtaining part.

Furthermore, in the management system, the individual certificate obtaining part may include a part to obtain the individual certificate in a case that the managed device receives a response that the managing device registers the managed device as a managing object by the direct managed part.

Moreover, in the management system, the managed part may not be validated for direct management while the managed part is valid for indirect management.

Furthermore, the disclosure provides a method for controlling a managed device including a managed part (1) being directly managed by a managing device via a communication line, or (2) being indirectly managed by the managing device via a communication line and an intermediate device, the method including: validating the managed part for direct management; determining that a certificate set for communicating with the managing device is a common certificate without an ID of the managed device; and obtaining an individual certificate with the ID of the managed device.

In the method, the managed part may include, when being directly managed, a part to be certified by the managing device and be managed by the managing device by communicating with the managing device; and the managed part may include, when being indirectly managed, a part to be certified by the intermediate device and be managed by the managing device by communicating with the managing device via the intermediate device.

Moreover, the method may include setting the individual certificate obtained by the obtaining as the certificate for communicating with the managing device.

In the method, the obtaining may obtain the individual certificate via a connection over the communication line established by the common certificate.

Furthermore, in the method, the obtaining may include sending the ID of the managed device to the managing device in obtaining the individual certificate.

Moreover, the method may include determining an error in a case that the ID sent to the managing device by the obtaining does not correspond to the ID in the individual certificate obtained by the obtaining.

In the method, the obtaining may include obtaining the individual certificate in a case that the managed device receives a response that the managing device registers the managed device as a managing object by the direct managed part.

Furthermore, in the method, the managed part may not be validated for direct management while the managed part is valid for indirect management.

Moreover, the disclosure provides a computer-readable recording medium recorded with a program of instructions executable by a computer to control a managed device including a managed part (1) being directly managed by a managing device via a communication line, or (2) being indirectly managed by the managing device via a communication line and an intermediate device, the program comprising: a validating code for validating said direct managed part for direct management; a determining code for determining that a certificate set for communicating with the managing device is a common certificate without an ID of the managed device; and an obtaining code for obtaining an individual certificate with the ID of the managed device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a diagram showing an example of a configuration of a management system that includes a managed device;

FIG. 11 is a diagram showing an example of a not-registered screen displayed in a process shown in FIG. 9 and FIGS. 10A, 10B;

FIG. 12 is a diagram showing an example of a registration-completion screen displayed in the process shown in FIG. 9 and FIGS. 10A, 10B;

FIG. 13 is a diagram showing an example of a partial-registration-completion screen displayed in the process shown in FIG. 9 and FIGS. 10A, 10B;

FIGS. 17A, 17B are diagrams showing an example of a sequence corresponding to the process in FIG. 9 and FIGS. 10A, 10B that the managing device registers the managed device as a direct managing object;

FIGS. 19A, 19B are diagrams showing an example of a sequence when the user accesses to a intermediate device via a user interface and registers the intermediate device for the managing device;

FIGS. 20A, 20B are diagrams showing an example of a sequence when the user gives an instruction to the intermediate device to search the managed device and to register the managed device for the managing device;

FIGS. 24A, 24B are flowcharts showing a process conducted by the managed device when the managed device turns on;

FIGS. 25A, 25B are diagrams showing an example of a sequence in a case that the managed device obtains the individual certificate from the managing device, corresponding to the process shown in FIGS. 24A, 24B;

FIGS. 28A, 28B, 29A, and 29B show operations in a background mutual authentication process.

DESCRIPTION OF THE PREFERRED EMBODIMENT

Figure 2A:
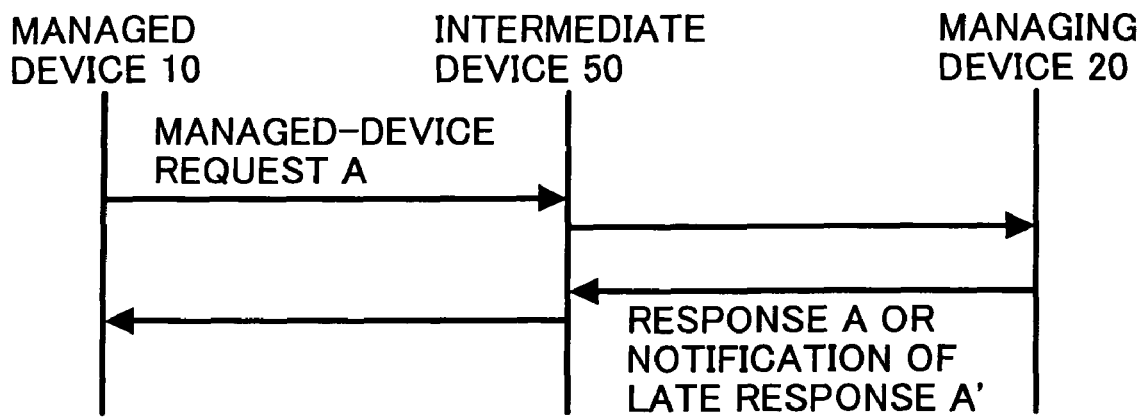
FIGS. 2A, 2B are diagrams showing a model of a data transmission of requests and responses.

In the following, an embodiment of the present invention will be described with reference to the accompanying drawings.

First, an example of a configuration of a managed device and a management system in this embodiment will be described. FIG. 1 is a diagram showing an example of a configuration of the management system that includes the managed device.

The management system is provided with communication apparatuses as the managed devices 10, including 10a-10h (referred to collectively as 10). The communication apparatuses can include any one of an imaging device such as a printer, a facsimile, a copier, a scanner, a multi-functional device, a network home appliance, a vending machine, medical equipment, a power unit, an air conditioning system, a measuring system for gas, water, electricity and the like, an automobile, an aircraft, and the like.

In the management system, a managing device 20 that can communicate with the managed devices 10 manages the managed devices 10. In this embodiment, to manage means to obtain information from an object device and to perform some operations based on the information.

The operations are, for example, in a case that the managed devices are imaging devices, to collect page counts, to notify an error to a service center to call a service person according to information from the managed device, to update firmware of the managed devices in a case that the version of the firmware is old, or just to store obtained information.

A communication line between the managed devices 10 and the managing device 20 may be a fixed line or a wireless line. For example, the Internet can be applied. Additionally, in the management system, one or more intermediate devices 50, including 50a-50c (referred to collectively as 50), may be provided for intermediate communications between the managed devices 10 and the managing devices 20.

For example, in an installation environment A in FIG. 1, the managed device 10a and the managed device 10b are under the intermediate device 50 that can establish a direct connection with the managing device 20. On the other hand, in an installation environment B in FIG. 1, the managed device 10c, the managed device 10d, and the intermediate device 50c are under the intermediate device 50b that can establish a direct connection with the managing device 20. Furthermore, the managed device 10e and the managed device 10f are under the intermediate device 50c. In this case, information from the managing device 20 is sent to the managed device 10e and the managed device 10f via the intermediate device 50b and the intermediate device 50c.

In this embodiment, a function to be managed by the managing device 20 via the intermediate device 50 is referred to as an indirect-managed-function and a state is referred to as an indirect-managed-state for the indirect-managed-function of the managed device 10.

The intermediate devices 50 are provided with an intermediating function such as a protocol converting function to enable the managed devices 10 to communicate with the managing device 20 with a general protocol in a case that the managing device 20 needs a special protocol for remote management.

In this embodiment, the intermediate devices 50 are provided in the same local area network (LAN) as the managed devices; however the intermediate devices 50 can be installed anywhere if the intermediate devices 50 can communicate with the managed devices 10 via a secure line.

Additionally, it is possible to provide the managed devices 10 with functions of the intermediate devices 50. As shown in an installation environment C, the managed devices 10g, 10h with intermediating functions may be connected to the managing device 20 without any intermediate devices 50. In that case, a function to be managed by the managing devices 20 without the intermediate device 50 is referred to as a direct-managed-function and a state is referred to as a direct-managed-state for the direct-managed-function of the managed devices 10.

Additionally, although not shown in FIG. 1, it is possible that the managed devices 10 in the direct-managed-state intermediate communication of other managed devices 10 that are connected under the managed devices 10 in the direct-managed-state.

Moreover, in each installation environment, a firewall 60, including 60a-60c (referred to collectively as 60), may be installed in view of security.

The intermediate devices 50 are provided with application programs to manage the managed devices 10 and the managing device 20 is provided with application programs to manage the intermediate devices 50 and the managed devices 10 managed by the intermediate devices 50. Nodes including the managed devices 10 send a request for a process and receive a response as a result of the process. For example, a RPC (remote procedure call) to methods of the application program may be applied.

That is, the intermediate devices 50 or the managed devices 10 under the intermediate devices 50 generate requests to the managing device 20, send the requests to the managing device 20, and receive responses to the requests. On the other hand, the managing device 20 generates requests to the intermediate devices 50 side, sends the requests to the intermediate devices 50 side, and receives responses to the requests. The requests include obtaining information from the managed devices 10 by making the intermediate devices 50 send requests to the managed devices 10 and by receiving responses from the managed devices 10 from the intermediate devices 50.

Additionally, well known protocols, techniques and standards may be applied to realize RPC, such as SOAP (simple object access protocol), COM (component object model), CORBA (common object request broker architecture), and the like.

Figure 2B:
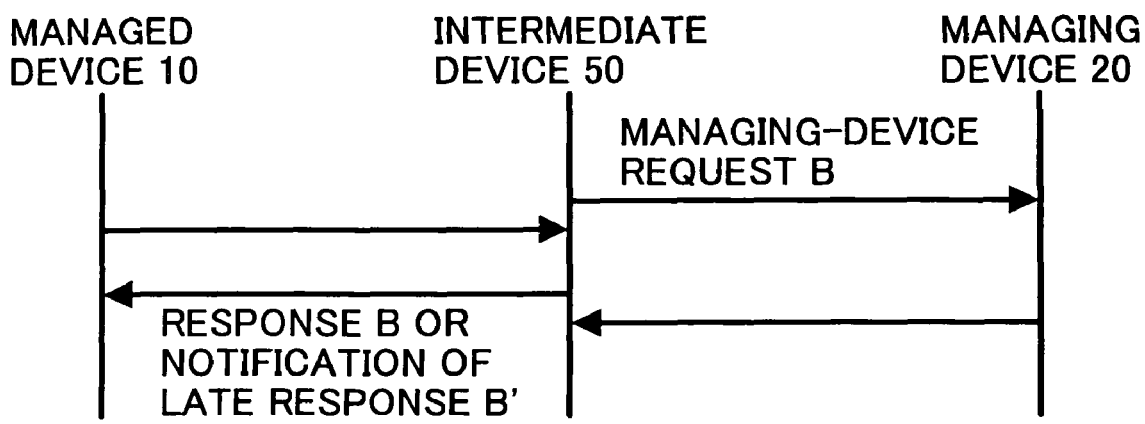

FIGS. 2A, 2B are diagrams showing a model of a data transmission of the requests and the responses.

A case (A), in FIG. 2A, is a case that a request to the managing device 20 arises in the managed device 10. In this case, the managed device 10 generates a managed-device-request A. The managing device 20 that receives the managed-device-request A via the intermediate device 50 replies a response A. The intermediate devices 50 may be installed (the installation environment B in FIG. 1). Additionally, in the case (A), not only the response A but a notification of late response A' is also shown. The notification of late response A' is a response that is sent in a case that the managing device 20 determines that the managing device 20 cannot reply a response promptly when the managing device 20 receives a request. After sending the notification of a late response and cutting off the connection, the managing device 20 sends the response in a subsequent connection.

A case (B), in FIG. 2B, is a case that a request to the managed device 10 arises in the managing device 20. In this case, the managing device 20 generates a managing-device-request B. The managed device 10 that receives the managing-device-request B via the intermediate device 50 replies a response B. Additionally, in the case (B) the managed device 10 also sends a notification of a late response B' in a case that the managed device 10 cannot reply a response promptly.

Figure 3:
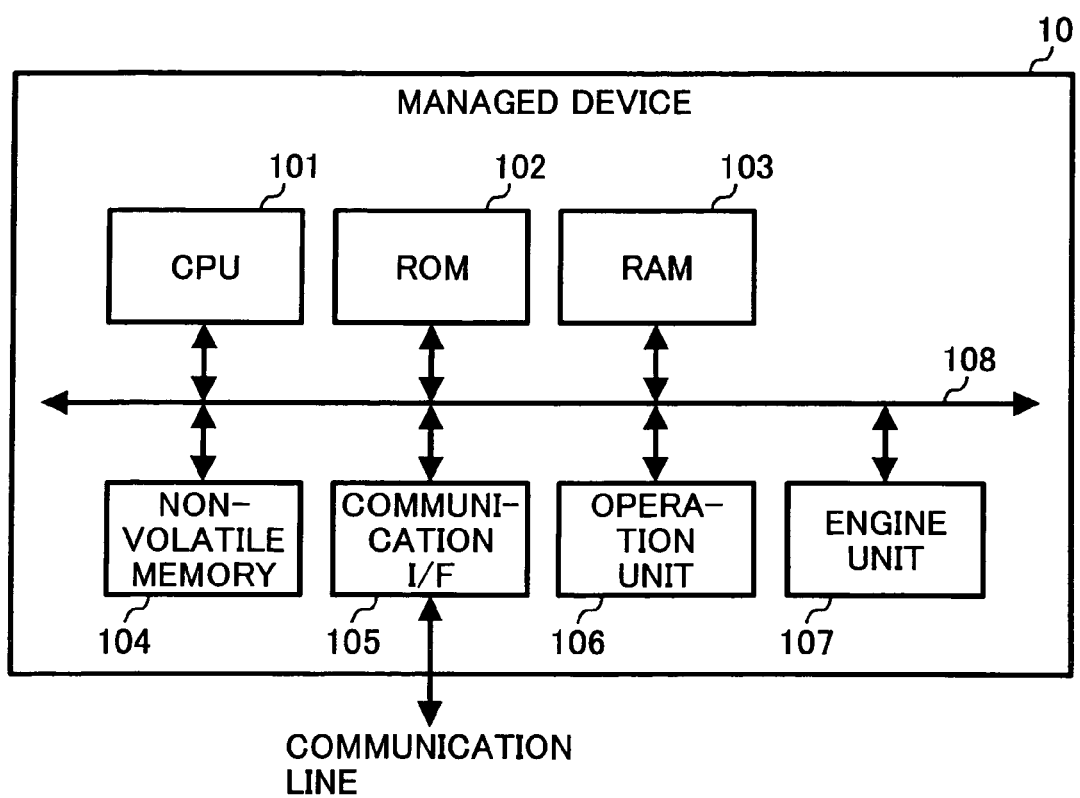
FIG. 3 is a diagram showing a hardware configuration of the managed device.

FIG. 3 is a diagram showing a hardware configuration of the managed device 10.

As shown in FIG. 3, the managed device 10 includes a CPU (central processing unit) 101, a ROM (read only memory) 102, a RAM (random access memory) 103, a non-volatile memory 104, a communication I/F (interface) 105, an operation unit 106, and an engine unit 107, which are mutually connected via a system bus 108.

The CPU 101 is a controlling part that controls the managed device 10 and functions as a certification obtaining part or the like by executing programs stored in the ROM 102 or the non-volatile memory 104.

The ROM 102 is a non-volatile storing part and stores programs executed by the CPU 101, static parameters, or the like. The ROM 102 may be a rewritable storing part so that stored data can be updated.

The RAM 103 is a storing part that stores temporary data or functions as a working memory for the CPU 101.

The non-volatile memory 104 is a rewritable non-volatile storing part such as a flash memory or a HDD (hard disc drive) and stores programs executed by the CPU 101 or parameters that are required to be stored after the device is turned off. The certifications that the managed device 10 uses in a certifying process are also stored here.

The communication interface 105 is an interface to connect the managed device 10 to the communication line and may be, e.g., an Ethernet interface. This communication interface 105 and the CPU 101 function as a communicating part. Additionally, a plurality of communication interfaces 105 may be provided according to a plurality of protocols or standards.

The operation unit 106 is an operation part that displays operation states of the managed device 10, contents of the setting of the managed device 10, messages to user, or the like, and receives user operations. For example, the operation unit 106 may include a keyboard and an operation panel with an LCD (liquid crystal display) display and a touch panel.

The engine unit 107 is hardware other than each part described above for the managed device 10 to function as the managed device 10 itself. For example, in a case that the managed device 10 is a multi-functional device, the engine part 107 includes an image processing unit, image scanning unit, facsimile unit, and the like. And the CPU 101 controls these units so that the managed device 10 can perform various processes such as copying, printing, scanning, facsimileing. Additionally, some managed devices 10 may not have the engine unit 107, and the engine unit 107 has little relation with this embodiment, and is therefore only shown simply.

Of course, other hardware may be provided such as a display unit (for example a LCD (liquid crystal display)) or an operation unit (for example a touch panel or a keyboard).

The managed device 10 and the intermediate devices 50 may be provided with the same hardware configuration. However especially in the case of the managed device 10, additional configuration or resources may be applied.

In each device described above, the CPU 101 executes various programs and realizes each function described above and below.

Additionally, the managed devices 10, the intermediate devices 50, and the managing device 20 store public key certificates, private keys, and root key certificates, and perform cross certifications and unilateral certifications with each other with these certifying information.

Figure 4A:
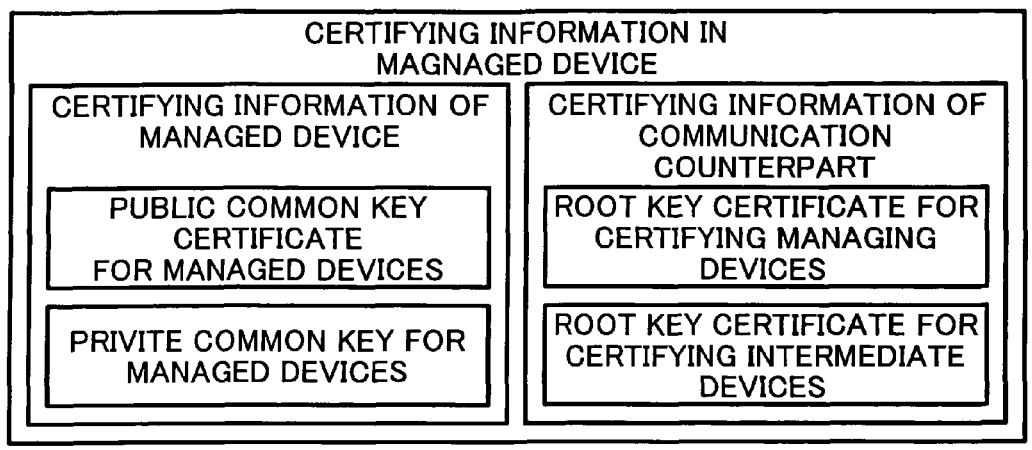
FIG. 4A to FIG. 4C are diagrams showing types of certifications and keys that are stored in the managed devices, managing devices, and intermediate devices.
Figure 4B:
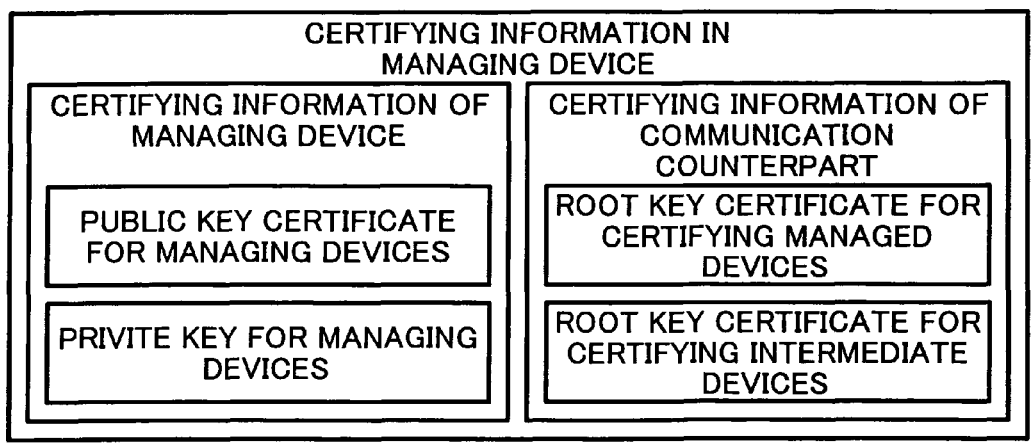
Figure 4C:
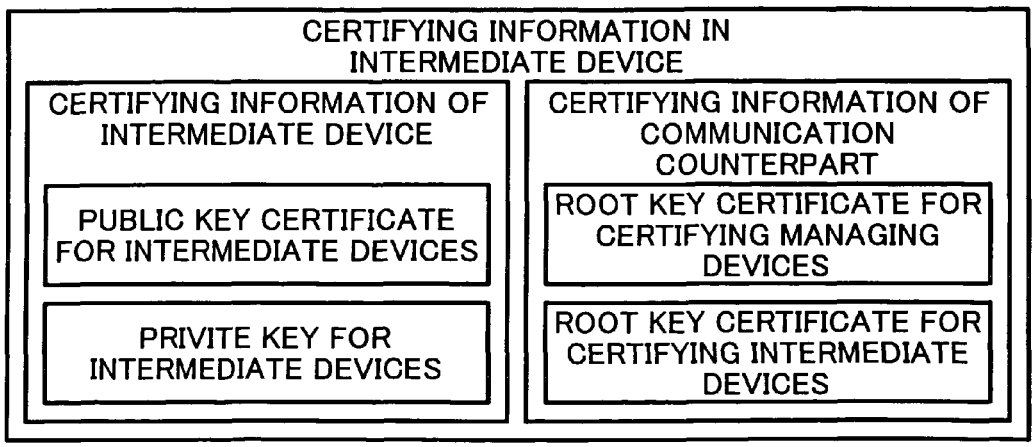

FIG. 4A to FIG. 4C are diagrams showing types of certifications that are stored in the managed devices 10, managing device 20, and intermediate devices 50.

As shown in these diagrams, 4A to 4C respectively, the managed devices 10, the managing device 20, and the intermediate devices 50 store public key certifications, private keys that are certifying information of themselves, and root key certificates that are certifying information of communication counterparts.

For example, a common public key certificate for managed devices 10 is a digital certificate that includes a public key issued by a proper communication apparatus and a digital signature on the public key. The digital signature can be certified with a root key for certifying managed devices.

Figure 5:
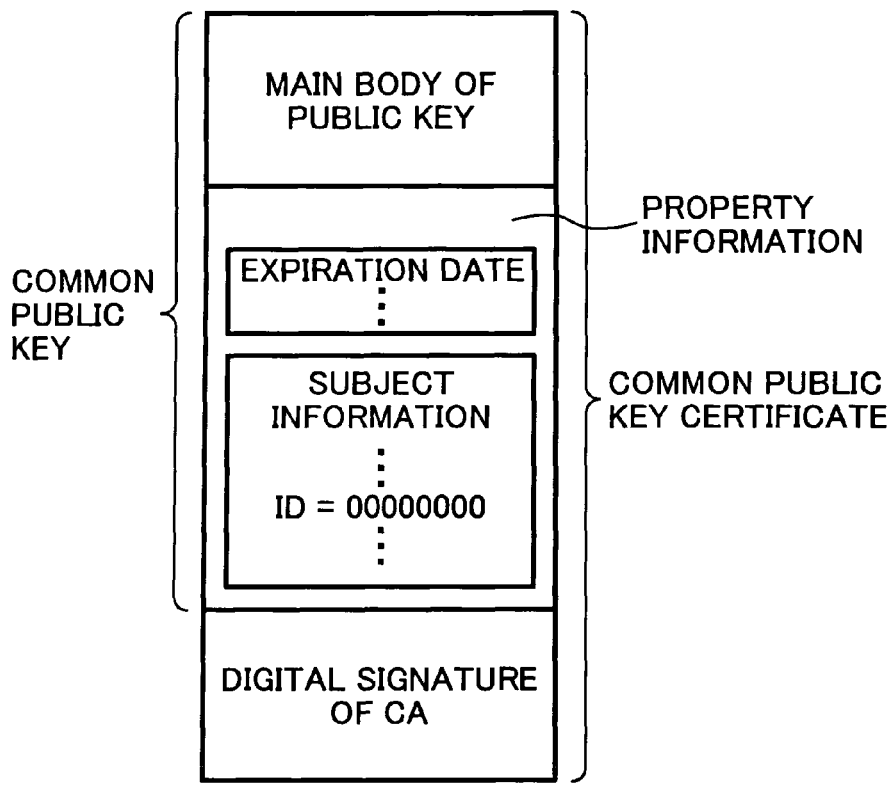
FIG. 5 is a diagram showing a configuration of a common certificate.

FIG. 5 is a diagram showing a configuration of the common public key certificate for managed devices 10. The common public key certificate does not include an ID of the managed device and all managed devices can store this common certificate (although it is not necessary for all managed devices to store this common certificate). Accordingly, it is necessary to send the ID of managed device separately to specify an individual managed device.

In this technique, there is a problem of spoofing because it is possible to tamper with the ID. In contrast to the ID in the public key certificate, there is no measure to prevent falsification in this technique. Additionally, the common public key certificate and the common private key are spread widely so that they are more likely to be stolen.

However, it is easy to set the common public key certificates in the managed devices 10 as manufactured without special equipment because they are common.

Even if such common public key certificates are used, it is possible to maintain a security level by preventing the intermediate devices 50 from communicating with managed devices 10 outside the LAN because even if the ID of a managed device 10 is tampered with, a spoofing happens only among the managed devices 10 in the LAN. Therefore, in this embodiment when the managed devices 10 are manufactured, the common public key certificates are installed in the managed devices 10, and after that the common public key certificates are updated with the other certificates to improve the security level.

A private key for managed devices is a private key corresponding to the common public key described above. And a root key certificate for certifying managed devices 10 is a digital certificate that includes a root key for certifying managed devices 10 with a digital signature that can be certified with the root key. The digital signature is added using a root private key corresponding to the root key for certifying managed devices 10.

Moreover a public key certificate for managing device 20, a private key for managing device 20, and a root key certificate for managing device 20 have a similar relation. A public key certificate for intermediate devices 50, a private key for intermediate devices 50, and a root key certificate for intermediate devices 50 have a similar relation.

However, as described above, the certification based on public key certificates without unique IDs of the devices is less secure than the certification based on public key certificates with unique IDs of the devices. On the other hand, the managing device 20 and intermediate devices 50 are essential devices for the managing system so it is easier to manufacture them in the factory with special equipment. Therefore, in this embodiment, the public key certificate for managing device 20 and the public key certificate for intermediate devices 50 are individual public key certificates with unique IDs of the devices (for example, serial numbers). Accordingly it is possible to specify an individual based on the IDs in the certificates in a certifying process.

Figure 6:
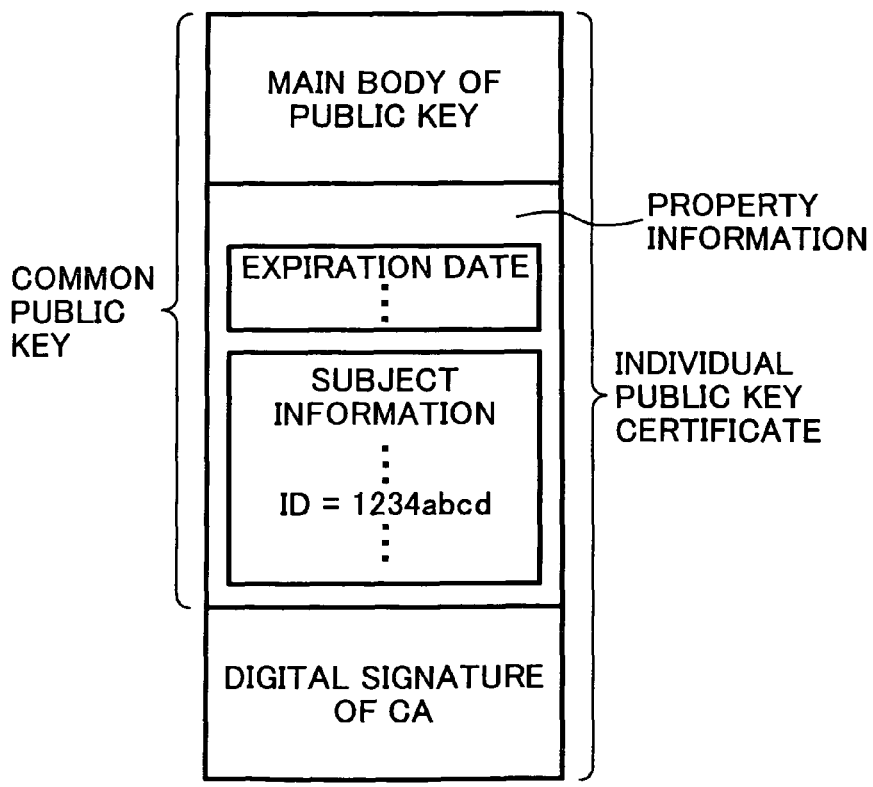
FIG. 6 is a diagram showing a configuration of an individual certificate.

FIG. 6 is a diagram showing an example of the individual public key certificate. In this case, if the ID in the certificate is tampered with, it is impossible to certify the public key certificate with the root key certificate, and therefore it is practically impossible to spoof and the security level improves.

In the management system shown in FIG. 1, a user who requests remote management service for managed devices 10 needs to make a contract with a service provider. After that the managed devices 10 are registered for the managing device 20. And the managing device 20 identifies the managed devices 10 as managing objects based on the registration, and starts remote management.

The registration described above is performed by the intermediate devices 50 instead of the managed devices 10 in a case the managed devices 10 communicate with managing device 20 via the intermediate devices 50, that is the managed devices 10 do not have the intermediating functions or that invalidate the intermediating functions (see e.g. installation environments A, B). In this case, the managing device 20 memorizes that the managed devices 10 communicate with the managing device 20 via the intermediate devices 50; that is, that the managed devices 10 are under control of the intermediate devices 50.

On the other hand, the managed devices 10 communicate directly with the managing device 20 and perform registration in a case the managed devices 10 have the intermediating functions and validate the intermediating functions (see e.g. installation environment C). In this case, the managed devices 10 are in the direct-managed-state and are required to have a security level as high as the intermediate devices 50 because, in communicating directly with the managing device 20, it is possible to spoof any managing objects in a case that the IDs of the managed devices 10 are tampered with.

Therefore, in this embodiment, in a case that it is determined that the certificate for communication with managing device 20 of a managed device 10 is common when the managed device 10 becomes direct-managed-state, the managed device 10 obtains the individual public key certificate for managed devices with its unique ID.

That is, registration of the managed devices 10 for the managing device 20 is for the purpose of certifying individuals.

Figure 7:
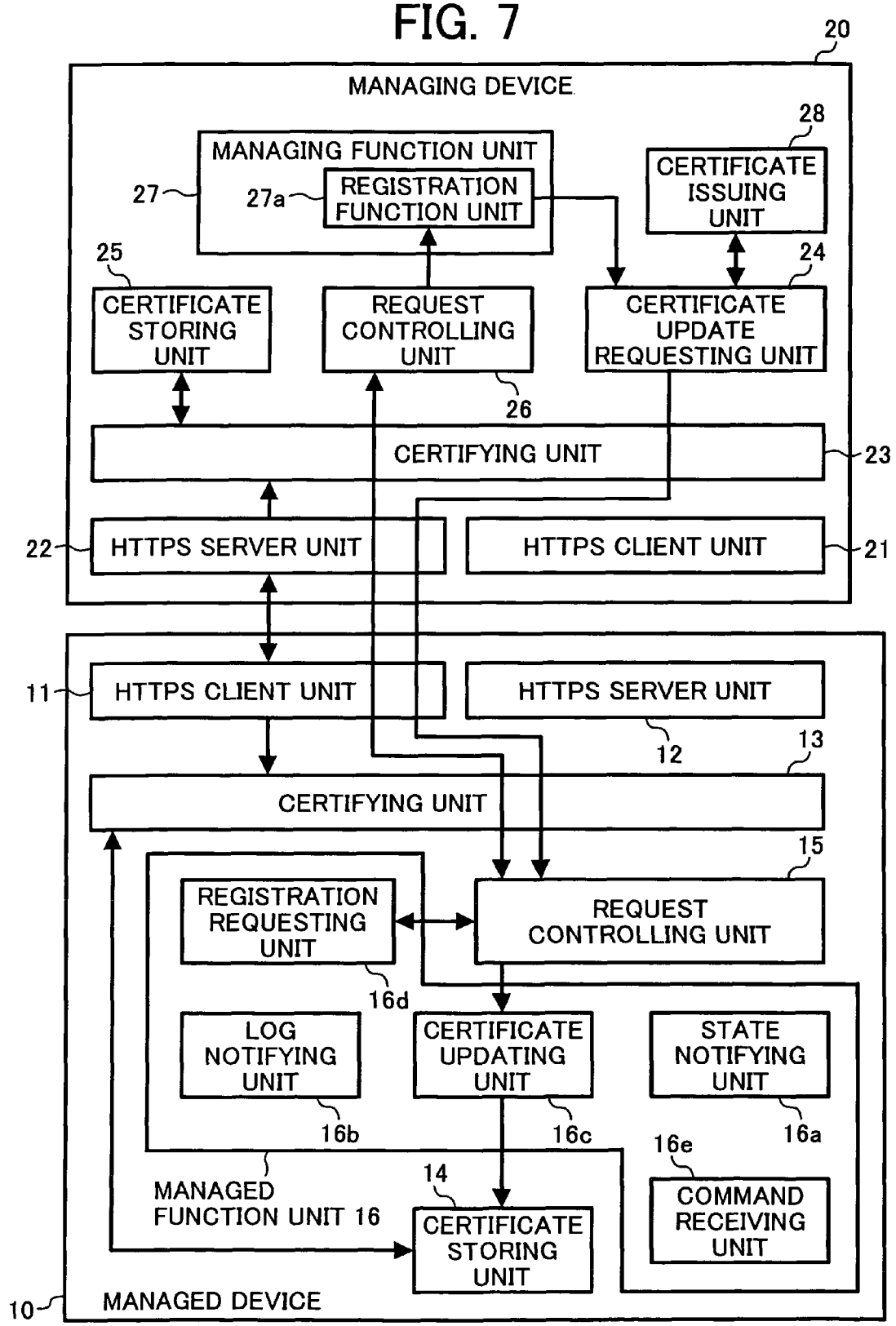
FIG. 7 is a diagram showing functions of the managed device and the managing device.

FIG. 7 is a diagram showing functions of the managed device 10 and the managing device 20. In this diagram, the managed device 10 and the managing device 20 communicate with each other directly. And in general the same functions are realized also in a case that the intermediate device 50 intermediates the communication. In this case, only the protocol is different.

The managed device 10 is provided with an HTTPS (hypertext transfer protocol security) client unit 11, an HTTPS server unit 12, a certifying unit 13, a certificate storing unit 14, a request controlling unit 15, a managed function unit 16 (16*a* to 16*e*), and a registration requesting unit 17.

The HTTPS client unit 11 includes functions that send an HTTPS connection request to an HTTPS server according to an HTTPS protocol (for example based on SSL) and send requests (commands) or data to the communication counterpart with the HTTP server such as the managing devices 20.

The HTTPS server unit 12 includes functions that receive the HTTPS connection request from the HTTPS client, receive requests or data from the communication counterpart with the HTTPS client, and reply the result of the process conducted by each part of the device as a response.

The certifying unit 13 includes functions that perform the certifying process that is for the HTTPS client unit 11 and the HTTPS server unit 12 to certify the communication counterpart using digital certificates that are received from the communication counterpart or stored in the certificate storing unit 14, private keys or the like.

The certificate storing unit 14 includes functions that store certifying information such as the certificates and private keys shown in FIG. 4.

The request controlling unit 15 includes functions that determine whether the request received from the managing device 20 is proper or not. And if it is proper, the request controlling unit 15 sends the request to units 16a to 16e that actually perform the process according to the request.

The state notifying unit 16a includes functions that notify states of the managed device 10 to the managing device 20 in a case that the managed device 10 detects an error or a user gives an instruction. This notification may be sent as a response to a request from the managing device 20 or as a request from the HTTPS client unit 11 to the higher devices (the intermediate device 50 or the managing device 20).

The log notifying unit 16b includes functions that notify logs from the managed device 10 to the managing device 20. The logs include operation logs of the managed device 10 or the like. For example, in a case that the managed device 10 is an imaging device, the logs include page counts, and in a case that the managed device 10 is a measuring system, the logs include measured figures. This notification is generally not urgent, and therefore this notification may be a response to a request from the managing device 20.

The certificate updating unit 16c includes functions that the certificates or the like stored in the certificate storing unit 14 correspond with the certificates or the like received from the managing device 20. Accordingly, the managed device 10 can set the individual public key certificate for managed devices instead of the common public key certificate for managed devices as the certificate for communicating with the managed device 20.

The registration requesting unit 16d includes functions that request a registration of the managed device 10 for the managing device 20 as a managing object.

The command receiving unit 16e includes functions that perform operations according to the requests that are not related with other units from 16a to 16d described above. The operations include, for example, transmitting data stored in the managed device 10, controlling the engine unit 107, etc. Additionally, state notifying unit 16a, log notifying unit 16b, and the like are described as concrete examples of functions provided by the command receiving unit 16e. These functions (state notifying and log notifying) may not be necessary.

The functions described above are realized by the CPU 101 executing programs and controlling each part of the managed device 10.

The managing device 20 includes an HTTPS client unit 21, an HTTPS server unit 22, a certifying unit 23, a certificate update requesting unit 24, a certificate storing unit 25, a request controlling unit 26, a managing function unit 27, and a certificate issuing unit 28.

The HTTPS client unit 21, as well as the HTTPS client unit 11 in the managed device 10, includes functions that send an HTTPS connection request to an HTTPS server according to an HTTPS protocol and send requests or data to the communication counterpart with the HTTP server such as the managed devices 10.

The HTTPS server unit 22, as well as the HTTPS server unit 12 in the managed device 10, includes functions that receive the HTTPS connection request from the HTTPS client, receive requests or data from the communication counterpart with the HTTPS client, and reply the result of the process conducted by each part of the device as a response.

The certifying unit 23 is similar to the certificate storing unit 13 in the managed device 10, but the certifying unit 23 uses certificates and the like stored in the certificate storing unit 25.

The certificate updating unit 24 includes functions that send the individual public key certificates to the communication counterparts such as the managed device and direct them to store the certificates.

The certificate storing unit 25 includes functions that store the certifying information such as the certificates and the private keys shown in FIG. 4 and provide the certifying information for the certifying unit 23.

The request controlling unit 26 includes functions that determine whether the requests received from the managed devices 10 are proper or not. And if the request is proper, the request controlling unit 26 notifies contents of the request to the managing unit 27. The registration function unit 27a is only an example of the managing unit 27 shown in this diagram, but practically other managing units 27 may be installed in the managing unit 10.

The registration function unit 27a includes functions that register the managed device 10 or the intermediate device 50 as managing objects and that direct the certificate updating unit 24 to send the individual public key certificate to the managed device 10 when the registration function unit 27a receives the request from the managed device 10 in registering the managed device as the direct managing object.

The certificate issuing unit 28 includes functions of a communication apparatus that issues the individual public key certificates that are sent to the managed devices 10. The functions may include functions that store and control the certificates issued heretofore. The certificate updating unit 24 obtains the certificate from the certificate issuing unit 28 when the certificate updating unit 24 sends the individual public key certificate to the managed device 10.

Next, the process where the managed device 10 requests to register the managed device 10 for the managing device 20 as the direct managing object will be described.

The process may start according to a user instruction. The user may give the instruction via the user interface. For example the user interface may be provided by a web service function in the managed device 10 for a browser in a PC that accesses the web service function, may be provided by a special purpose client application, or may be provided in the display unit of the managed device 10 itself. Additionally, the browser may be provided in the managed device 10.

In the following, the browser as the user interface will be described in this embodiment.

Figure 8:
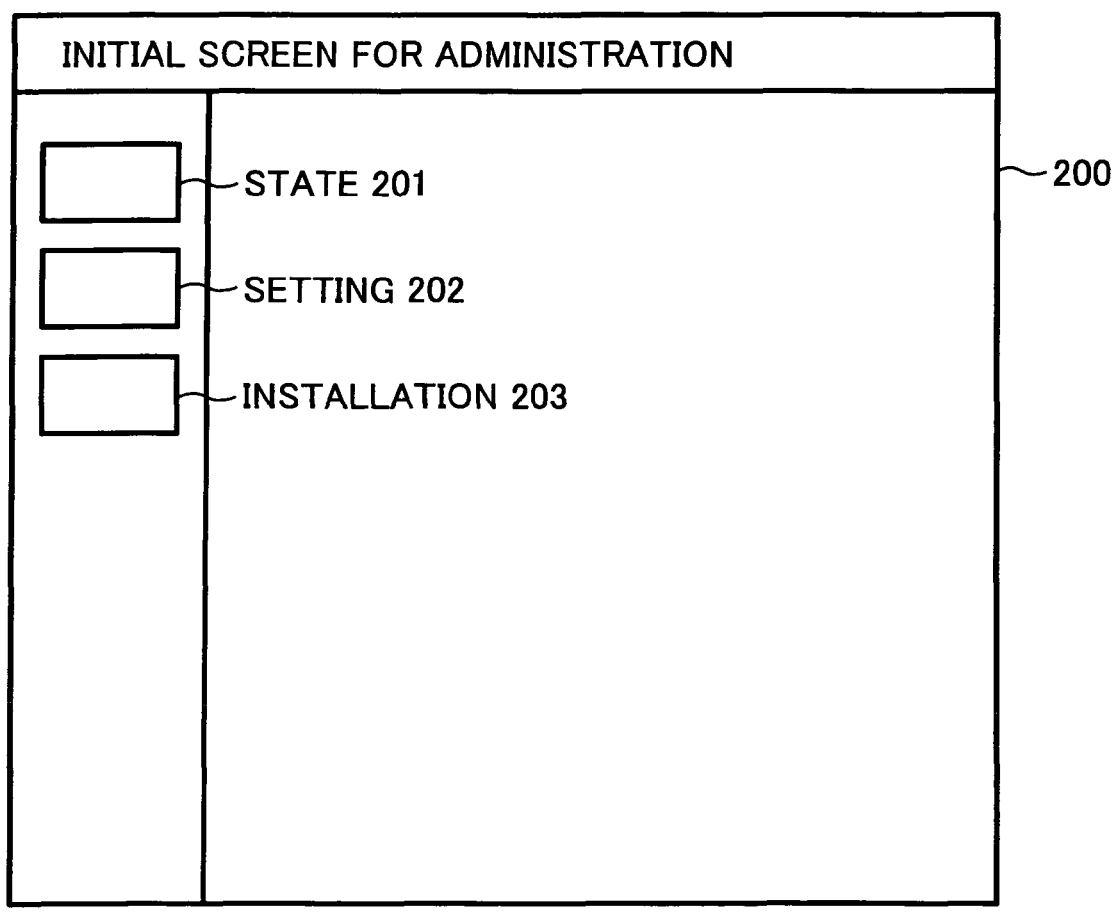
FIG. 8 is a diagram showing an example of an initial screen for administration that is displayed in a user interface.

FIG. 8 is a diagram showing an example of an initial screen for administration as a screen where the user inputs an instruction.

The initial screen 200 is a screen where the administrator for the management system inputs various settings or refers to the states of the managed device 10. In this embodiment, when the user accesses the managed device 10 by the web browser and selects an administrator mode in the web page, this initial screen for administration 200 is shown.

In this screen, there are buttons to give instructions to the managed device 10, such as a state button 201, a setting button 202, and an installation button 203.

The state button 201 is a button for the user to call a screen where the user can check the settings and the operation status of the managed device 10.

The setting button 202 is a button for the user to call a screen where the user inputs various settings such as a network communication setting and a user registration. And, for example, in a case that the managed device is a multi-functional device, the settings may be settings for printing or copying. These settings have little relation with this embodiment, and therefore a detailed description is omitted.

The installation button 203 is a button for the user to call a screen where the user gives an instruction to register the managed device 10 for the managing device 20. However, the screen shown in the user interface by clicking this button varies according to a registration flag and an intermediating function flag.

The registration flag is a flag indicating whether managed device 10 is registered for managing device 20 as a managing object, and an intermediating function flag is a flag indicating whether an intermediating function is used when managed device 10 communicates with managing device 20.

The registration flag is a flag that turns on when the managed device 10 is registered for the managing device 20 as a managing object. If the managed device 10 is registered for the managing device 20, the registration flag turns on both when the managed device 10 is in the direct-managed-state and when in the indirect-managed-state.

The intermediating function flag is a flag that turns on when the managed device 10 is registered for the managing device 20 not only as a managing object but also as a direct managing object. These flags are stored in the non-volatile memory 104 to maintain data after the managed device 10 turns off.

The managed device 10 refers to the registration flag and if the registration flag is on, the managed device 10 validates the managed function, and moreover if the intermediating function flag is on, the managed device 10 validates the intermediating function, that is validates the direct-managed function. On the other hand, if the intermediating function flag is off, the managed device 10 invalidates the intermediating function. Instead, the managed device 10 validates the indirect-managed function to communicate with the managing device 20 via the intermediate devices 50.

Figure 9:
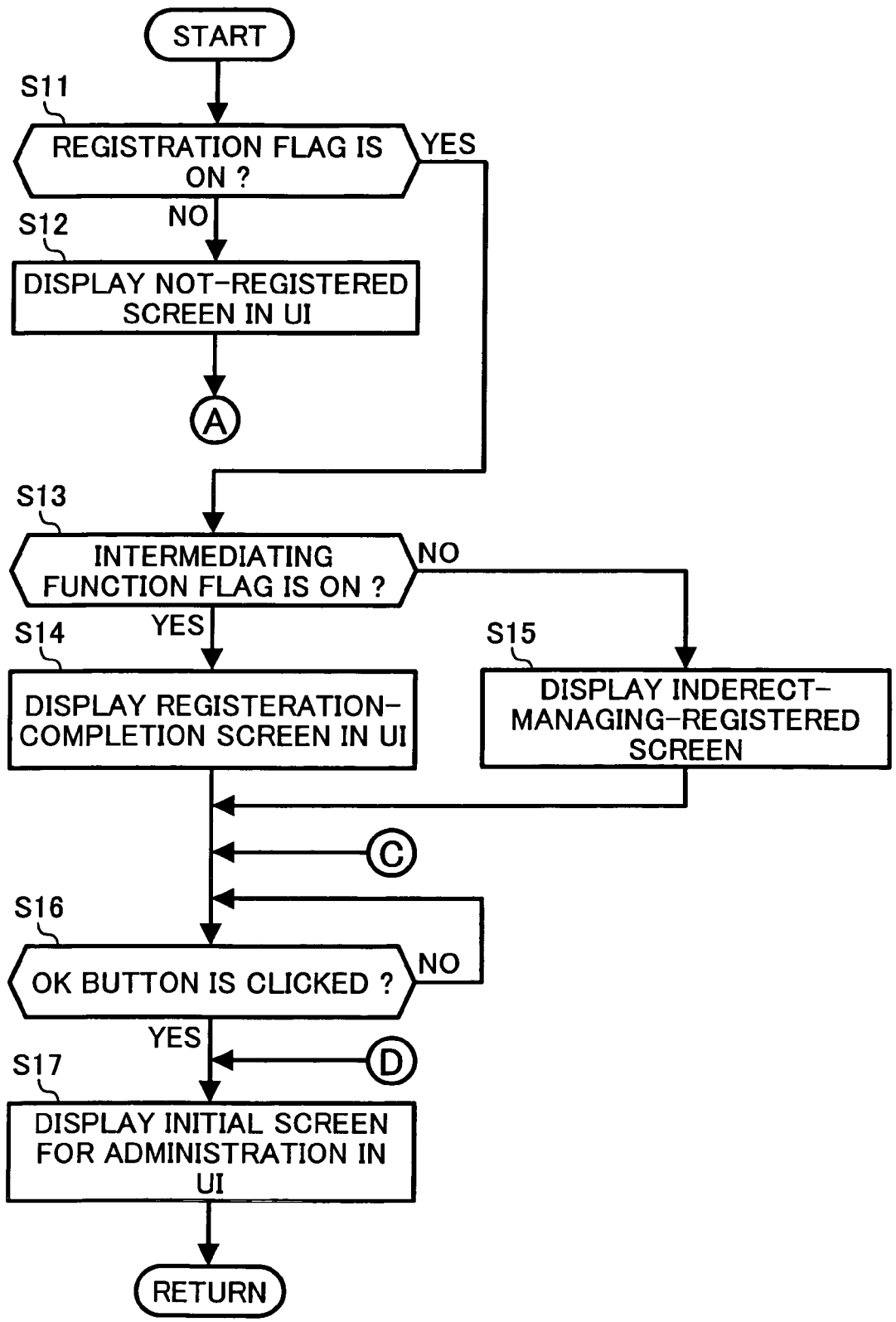
FIG. 9 is a flowchart showing a process conducted by a CPU in the managed device according to clicking an installation button shown in FIG. 8.
Figure 10A:
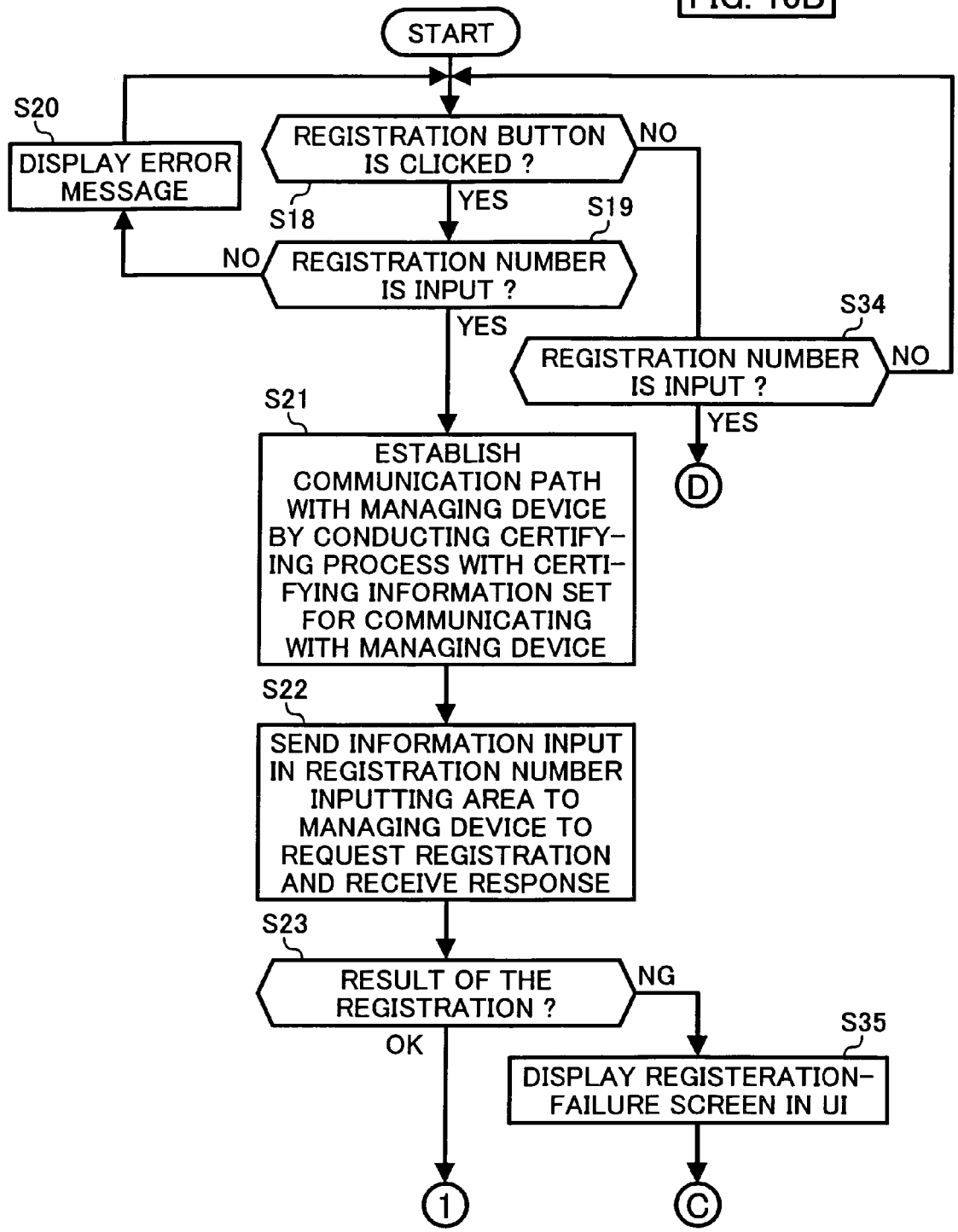
FIGS. 10A, 10B are continuations of the flowchart of FIG. 9.
Figure 10B:
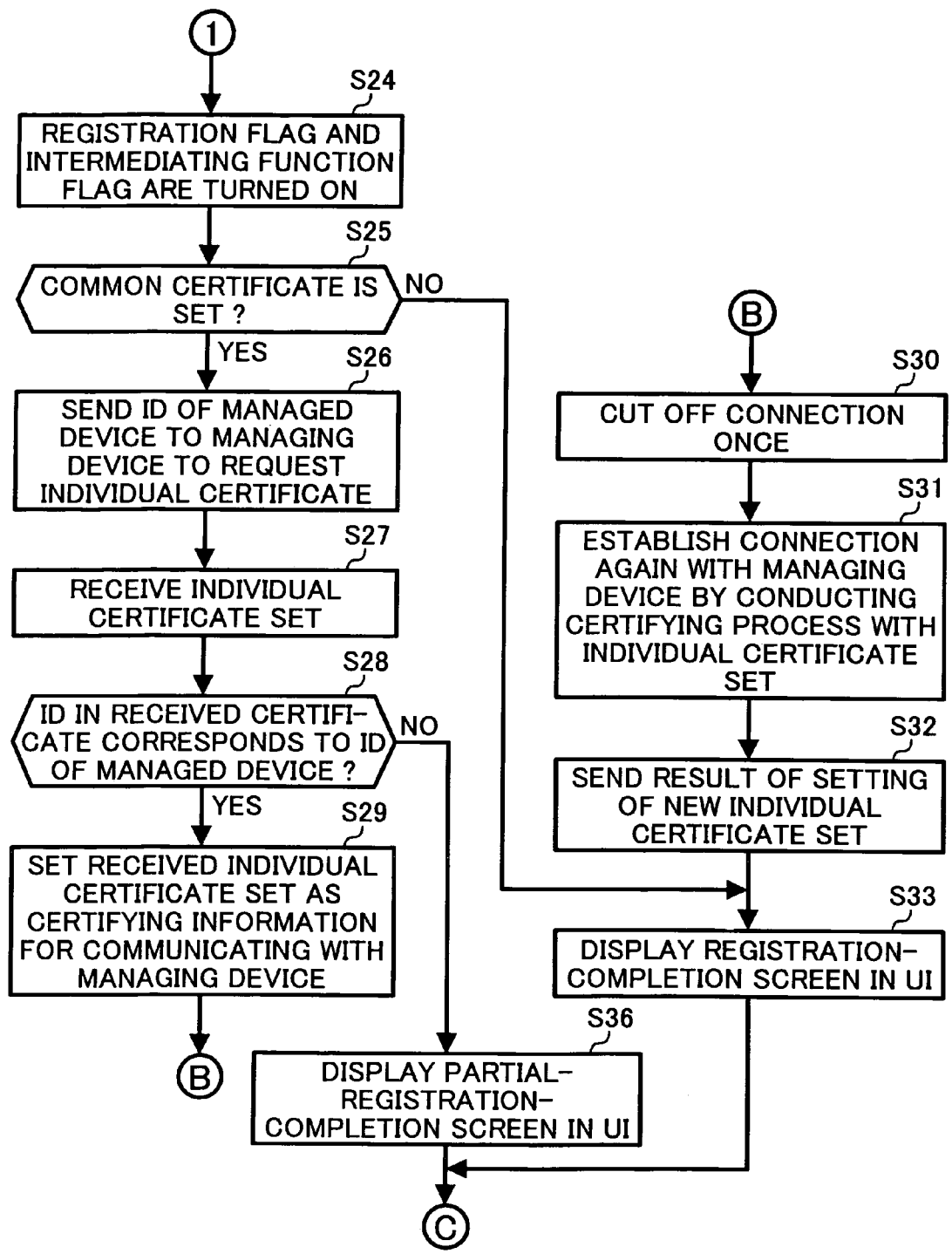

FIG. 9 and FIG. 10 (FIGS. 10A, 10B) are flowcharts showing a process conducted by the CPU 101 in the managed device 10 according to clicking the installation button 203.

The CPU 101 starts the process shown in the flowchart in FIG. 9 when the installation button 203 is clicked in the initial screen for administration 200 in FIG. 8.

In step S11, it is determined whether the registration flag is on or not. If it is not on, the process advances to step S12 to conduct a registration process. And a not-registered-screen is sent to the user interface (UI) (for example, the browser) and displayed.

FIG. 11 is a diagram showing an example of the not-registered-screen.

The not-registered-screen 210 is a screen where the user gives an instruction to register the managed device 10 for the managing device 20. Additionally, in this embodiment, if the managed device 10 is registered for the managing device 20 as an indirect managing object that communicates with the managing devices via the intermediate devices 50, the managed device 10 is registered by the intermediate device 50. Therefore, if the managed device 10 is registered for the managing device 20 in the non-registered-screen 210 with the user operation, the managed device 10 is registered as a direct managing object that communicates with the managing devices 20 directly.

If the process advances to this not-registered-screen 210 when the user clicks the installation button 203 in the initial screen for administration 200, it means that the managed device 10 is not registered for the managing device 20.

The not-registered-screen 210 includes a registration button 211, a state area 212, a registration number inputting area 213, and a back button 214.

The state area 212 is an area where the present state of the managed device 10 is displayed. In the not-registered-screen, usually "not registered" is displayed.

The registration number inputting area 213 is an area where the user inputs a registration number provided by the service provider of the management service. The registration number includes, for example, a contract number of the remote management contract and an ID such as a password.

The registration button 211 is a button for the user to request the registration. To request the registration, the user clicks this button after inputting the registration number in the registration inputting area 213. Accordingly, the managed device 10 sends a registration request with the information input in the registration inputting area 213 to the managing device 20.

Referring back to the flowchart, after step S12 in FIG. 9, the process advances to step S18 in FIG. 10. The process shown in FIG. 10 is a process corresponding to the not-registered-screen.

In step S18 and step S34 in FIG. 10, the CPU 101 waits for the click of one of the registration button 210 and the back button 211 in the not-registered-screen 210.

If the registration button 210 is clicked, it is determined whether the registration number is input or not in step S19. If the registration number is not input, in step S20 the error message is displayed to the user and the process returns to step S18.

On the other hand, if the registration number is input in step S19, the process advances to step S21. In step S21, the managed device 10 establishes a communication path by conducting a certifying process with the managing device 20. This certifying process, for example SSL, is a certifying process using a public key certificate or the like that is set as the certifying information for communicating with the managing devices 20. The certificates used in this certifying process may be the common public key certificate or the individual public key certificate in a case that the individual public key certificate was set when the managed device 10 was manufactured or was registered previously.

After the communication path is established, the managed device 10 sends the information input in the registration number inputting area 213 in step S22 to the managing device 20 to request the registration. At this point, an ID of the managed device 10 such as a serial number may be sent.

Additionally, information necessary to communicate with the managing device 20 such as an IP address of the managing device 20 is set in the managed device 10 beforehand by any well know technique. And this registration request can be sent without validating an intermediating function because the managed device 10 needs only to send the registration request unilaterally and does not need to process requests from the managing device 20.

As described above, the registration in this process means that the managed device 10 becomes the direct managing object.

Additionally, it is possible to use the same data format if the managing device 20 registers the managed device 10 not only as the managed device 10 but also as the intermediate device 50.

After that, in step S23, it is determined whether a result of the registration is a success or not based on a response from the managing device 20. If the result of the registration is a success (OK), the process advances to step S24 and the registration flag and the intermediating function flag are turned on and the intermediating function is validated.

The process advances to the following process concerning obtaining and setting the individual certificates.

In step S25, it is determined whether the certificate set as the certifying information for communicating with the managing devices 20 is the common certificate (the common public key certificate for managed devices) without the ID of the managed device 10. If it is the common certificate, Yes in step S25, the managed device 10 sends the ID of itself to the managing device 20 in step S26 to request the individual public key certificate for managed devices with the ID of the managed device 10 as a certificate for subsequent communication with the managing device 20.

The managing device 20 certifies the managed device 10 with the ID. If the ID corresponds to the ID of the registered managed device 10 for the managing device 20 (or the ID of a proper communication counterpart), the managing device 20 generates the public key certificate with the ID and sends the certificate as an individual certificate set including the private key and the root key certificate. The managed device 10 receives the individual certificate set in step S27.

Figure 16:
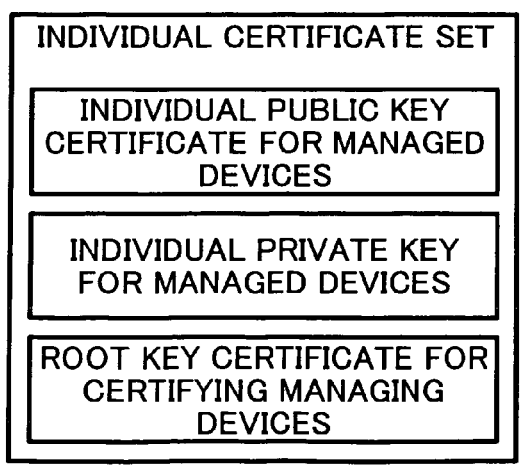
FIG. 16 is a diagram showing a configuration of an individual certificate set obtained by the managed device in the process shown in FIG. 9 and FIGS. 10A, 10B.

FIG. 16 is a diagram showing a configuration of the individual certificate set.

As shown in FIG. 16, the individual certificate set includes the individual public key certificate for managed devices, the individual private key for managed device, and the root key certificate for certifying managing devices.

In this embodiment, the individual public key for managed devices is the public key certificate that includes the ID of the managed device 10 as an ID of a subject. The individual private key for managed devices 10 is a private key corresponding to the public key in the individual public key for managed devices 10. The root key certificate for certifying the managing device 20 is a self-signed digital certificate that includes a root key for certifying a public key certificate for the managing device 20 to communicate with the managed devices 10. Additionally, the individual public key certificate for managed devices 10 may be certified with the root key for the common public key certificate. However this is not necessary. In a case that different root keys are used for certifying, a plurality of root keys can be stored in the managing device 20.

Additionally, in this embodiment, the individual public key certificate for managed devices 10 is sent by the managing device 20 as the individual certificate set; but this is not necessary. Only the individual public key certificate can be sent because the previous root key can be used after the registration (the certificates in the managing devices 20 are not changed) and the previous public key itself can be used after the registration as well if the certificate is issued again with new information.

Referring back to the flowchart in FIG. 10, after step S27, the process advances to step S28 and the CPU 101 determines whether the ID in the received certificate (the individual public key certificate for managed devices) corresponds to the ID of the managed device 10. This is done because if the certificate with a wrong ID is set, the managed device 10 can not communicate with the managing device 20 subsequently.

If the IDs correspond, the managed device 10 sets the received individual certificate set as the certifying information for communicating with the managing device 20 in step S29.

In step S30, the connection is cut off once. And in step S31, the managed device 10 establishes the connection again by conducting the certifying process with the managing device 20 with the individual certificate set in step S29. This certifying process uses for example SSL.

In step S32, the managed device 10 sends the result of setting a new individual certificate set to the managing device 20. And in step S33 the registration-completion-screen is sent to the user interface (for example, the browser) and displayed.

FIG. 12 is a diagram showing an example of the registration-completion-screen.

The registration-completion-screen is a screen to notify the completion of the registration to the user. In the registration-completion-screen, if the user clicks an OK button 221, the initial screen for administration 200 shown in FIG. 8 is displayed.

The step S16 and step S17 shown in FIG. 9 are the processes corresponding to the registration-completion-screen. After step S33 in FIG. 10, the process advances to step S16 in FIG. 9 and the CPU 101 waits for the click of the OK button 221. In step S17, the initial screen 200 is sent and displayed in the user interface. And the process according to the click of the installation button 203 ends and returns to the process in the initial screen 200.

If the IDs do not correspond in step S26 in FIG. 10, it is determined that the certificate is erroneous and the managed device 10 does not set the individual certificate set. In step S34 a partial-registration-completion-screen is sent to the GUI (for example, the browser) and displayed.

FIG. 13 is a diagram showing an example of the partial-registration-completion-screen. The partial-registration-completion-screen is a screen to inform the user that the registration of the managed device 10 for the managing device 20 succeeded, but that the set of the individual certificates failed. In the partial-registration-completion-screen, if the user clicks on OK button 231, the initial screen for administration 200 shown in FIG. 8 is displayed as well as the registration-completion-screen 220 described above.

In the flowchart the process advances to step S16 in FIG. 9.

In this case, the managed device 10 communicates with the managing device 20 with the common certificates at the moment, however the managed device 10 attempts to obtain the individual certificates again when the managed device 10 is turned on a next time, and the managed device 10 attempts to communicate with the managing device 20 or the like. This process will be described in detail with reference to FIG. 25 below.

If the individual certificate is already set in step S25 in FIG. 10, it is not necessary to obtain a new individual certificate, and therefore the process advances to step S33. In step S33 the registration-completion-screen is sent and displayed in the user interface.

If there is a failure (NG) in step S23, the process advances to step S35 and the registration-failure-screen is sent and displayed in the user interface.

Figure 14:
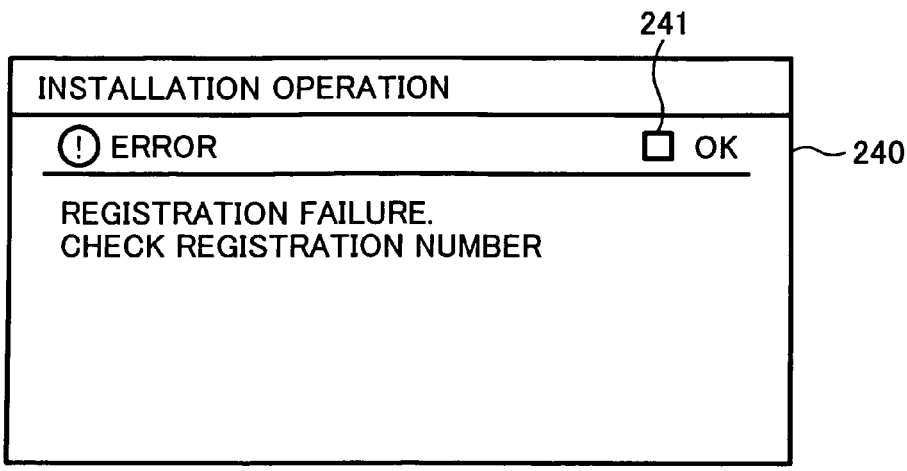
FIG. 14 is a diagram showing an example of a registration-failure screen displayed in the process shown in FIG. 9 and FIGS. 10A, 10B.

FIG. 14 is a diagram showing an example of the registration-failure-screen. The registration-failure-screen 240 is a screen to inform the user of the failure in the process of the registration. In the registration-failure-screen, if the user clicks on OK button 241, the initial screen for administration 200 shown in FIG. 8 is displayed as well as the registration-completion-screen 220 described above.

In the flowchart the process advances to step S16 in FIG. 9.

In a case that the back button 214 is clicked in step S34 in FIG. 10, the process advances to step S17 in FIG. 9. In step S17, the initial screen for administration 200 is sent and displayed in the user interface. And the process according to the click of the installation button 203 ends and returns to the process in the initial screen 200.

Next, the process in a case that the managed device 10 is already registered for the managing device 20 when the installation button 203 is clicked will be described.

In this case, the registration flag is on, and therefore the result of the determination in step S11 is YES and the process advances to step S13. In step S13, it is determined whether the intermediating function flag is on or not.

If the intermediating function flag is on, the managed device 10 is already registered for the managing device 20 as a direct managing object as well as in step S33 in FIG. 10. Therefore, in step S14 the registration-completion-screen is sent and displayed in the user interface as well as in step S33 in FIG. 10. In the registration-completion-screen, if the user clicks on OK button 221, the initial screen for administration 200 shown in FIG. 8 is displayed as well.

That is, in this case, the managed device 10 does not accept a new reference or new registration. Additionally, at this point it may be determined whether the individual certificate is installed or not, and if not the partial-registration-completion screen 230 shown in FIG. 13 may be displayed.

If the intermediating function flag is off in step S13, the managed device 10 is already registered for the managing device 20 as an indirect managing object. In this case, to prevent a double registration or to simplify the process (such as a transmission) on the managing device 20 side, the process advances to step S15. In step S15, an indirect-communication-registered-screen is sent and displayed in the user interface. That is, in this case that the managed function is on, the direct-managed-function does not turn on.

Figure 15:
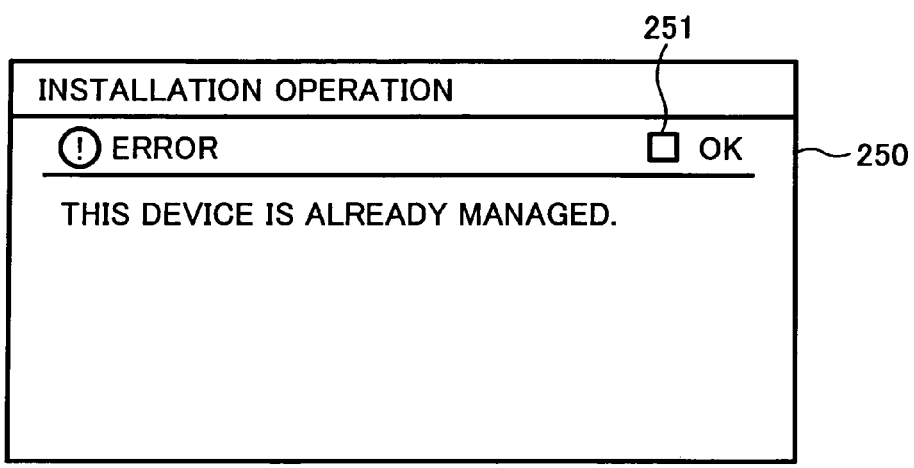
FIG. 15 is a diagram showing an example of a indirect-managing-registration-completion screen displayed in the process shown in FIG. 9 and FIGS. 10A, 10B.

FIG. 15 is a diagram showing an example of the indirect-communication-registered-screen. The indirect-communication-registered-screen 250 is a screen to inform the user that the managed device 10 is already registered for the managing device 20 as an indirect-managing-object. In the indirect-communication-registered-screen, if the user clicks on OK button 251, the initial screen for administration 200 shown in FIG. 8 is displayed as well as the registration-completion-screen 220 described above.

In addition, in FIG. 9 and FIG. 10 described above, the process from step S25 to step S32 corresponds to a certificate obtaining step. In that process, the CPU 101 functions as a certificate obtaining part.

Figure 18:
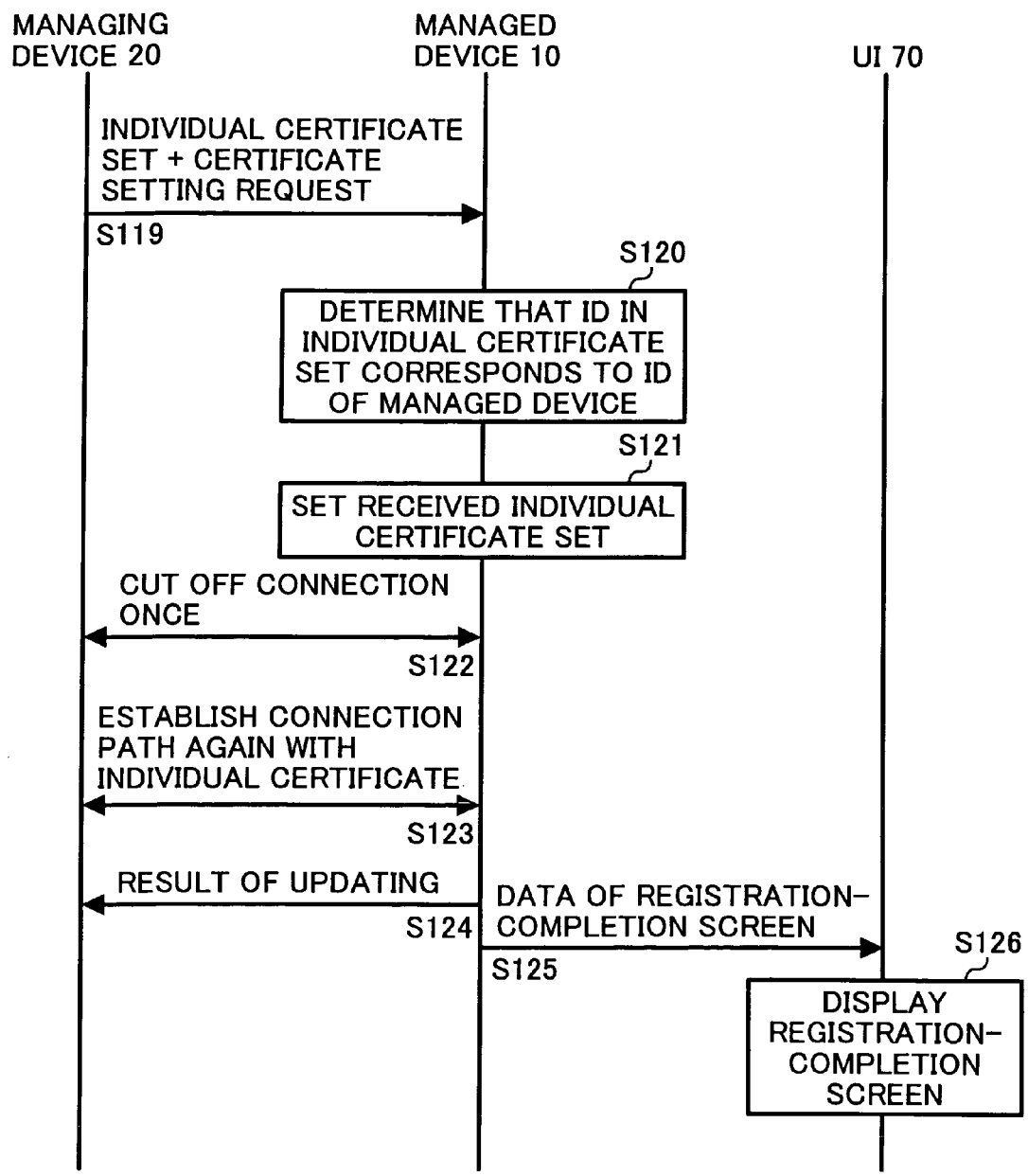
FIG. 18 is a continuation of the flowchart of FIG. 17.

FIG. 17 (FIGS. 17A, 17B) and FIG. 18 are diagrams showing an example of a sequence corresponding to the process that the managing device 10 registers the managed device 20 as a direct managing object which is described above. In this case, in the managed device 10, the common certificate is set as the public key certificate for communicating with the managing device 20.

The user accesses the managed device 10 with a user interface (UI) 70 (for example, in a PC). When the user requests an administrative operation (S101), the managed device 10 sends data of the initial screen for administration 200 to the user interface 70 (S102). The user interface 70 displays the initial screen for administration 200 based on the data.

When the user clicks on the installation button 203 in the initial screen for administration 200, the event is sent to the managed device 10 (S104). The managed device determines that the managed device 10 is in the not-registered-state at this point (S105) and sends data of the not-registered-screen 210 to the user interface 70 (S106). The user interface 70 displays the not-registered-screen 210 based on the data (S107).

When the user clicks on the registration button 211 after inputting the registration number in the not-registered-screen 210, the event with the input information is sent to the managed device 10 (S108).

The managed device 10 establishes the connection between the managing device 20 with the common certificate (S109) and sends the registration request with the input registration number to the managing device 20. The ID of the managed device 10 may also be sent. In response to the registration request sent by the managed device 10, the managing device 20 conducts a referring process for certifying the registration number sent by the managed device 10 (S111). If the result of the referring process is a success, the managing device 20 registers the managed device 10 as a direct managing object (S112) and sends the registration response indicating the result of the process (S113).

According to the registration response, the managed device 10 turns on flags and transitions to the direct-managed-state (S114).

At this point, if the managed device 10 determines the certificate set as the certifying information for communicating with the managing device 20 is the common public key certificate (S115), the managed device 10 sends a certifying information obtaining request with the ID of the managed device 10 (S116). In response to the certifying information obtaining request, the managing device 20 determines whether the individual certificate set is issued or not based on the ID of the managed device 10 or the like (S117). For example, the managing device 20 may determine that the individual certificate set can be issued if the managing device of the received ID is a managing object. And if the managing device 20 determines that the individual certificate set can be issued, the managing device 20 issues the individual certificate set (S118) and sends the issued individual certificate set with a certificate setting request to the managed device 10 (S19 in FIG. 18).

In response to the certificate setting request, the managed device 10 determines whether the ID in the individual certificate set corresponds to the ID of the managed device 10 (S120). If the IDs correspond, the managed device 10 sets the individual certificate set as the certifying information for communicating with the managing device 20 (S121).

Then the managing device 20 cuts off the connection between the managed device 10 once (S122) and establishes the new connection again between the managing device 20 with the individual certificate set in step S121 (S123). And the managed device 10 sends the result of updating certificate to the managing device 20 (S124). On the other hand, the managed device 10 sends data of the registration-completion-screen 220 to the user interface 70 (S125) and the user interface 70 displays the registration-completion screen 220 based on the data (S126).

The process described above allows the registration of the managed device 10 for the managing device 20 and to obtain and set the individual certificate in a case that the individual certificate is not set in the managed device 10.

Next, the registration process for registering the managed device 10 for the managing device 20 as the indirect managing object (the managed device 10 communicates with the managing device 20 via the intermediate device 50) will be described with reference to diagrams from FIG. 19 to FIG. 23.

In this embodiment, if the intermediate device 50 is not registered for the managing device 20 when the managed device 10 transitions to the indirect-managing-state, the managing device 20 registers the intermediate device 50 first.

Accordingly, FIG. 19 (FIGS. 19A, 19B) is a diagram showing an example of a sequence when the user accesses the intermediate device 50 with a user interface 80 and registers the intermediate device 50 for the managing device 20. In addition, in following diagrams, processes to establish the connection between the devices are omitted for the sake of simplification.

In the example described with reference to FIG. 1, the user can also access the intermediate device 50 with the user interface. For example, the user can register the intermediate device 50 in the screen of the user interface by obtaining data that is necessary to display the screen from the data intermediate device 50 that includes the web service function to send data to the user interface. In addition, the user interface to access the managed device 10 and the user interface to access the intermediate device 50 may be different. In addition, also in the following, the browser as the user interface will be described in this embodiment.

As shown in FIG. 19, the sequence in FIG. 19 is similar to the sequence shown in FIG. 17 in that the managing device 20 registers the managed device 10 that communicates with the managing device 20 directly. That is, the not-registered screen is displayed in user interface (UI) 80 (from S201 to S204) and the registration process is conducted based on the input registration number (from S205 to S212).

In addition, the intermediate device 50 may communicate with the managing device 20 via an open network such as the Internet, and therefore the individual certificate is set in the intermediate device 50 from the beginning. However, it is possible to obtain the individual certificate when the intermediate device 50 is registered for the managing device 20 as well as the managed device 10.

In addition, the screens displayed in the user interface 80 may be different from the screens displayed in the user interface 70 because the screens are designed for the intermediate devices 50. However, the screens are similar to the screens shown in FIG. 8 and the like, and therefore they are not shown in diagrams.

After the registration of the intermediate device 50 described above is performed, the user can give an instruction to the intermediate device 50 to search the managed devices 10 or the other intermediate devices 50 and to register the managed devices 10 or the other intermediate devices 50 for the managing device 20.

FIG. 20 (FIGS. 20A, 20B) is a diagram showing an example of a sequence of the process described above. In addition, the case that the managed device 10 is in a not-registered state is shown in this example.

When a user accesses the intermediate device 50 that is already registered for the managing device 20 and requests a registration operation, data of a device-registration screen is sent from the intermediate device 50 to the user interface 80 and displayed (from S221 to S224).

Figure 21:
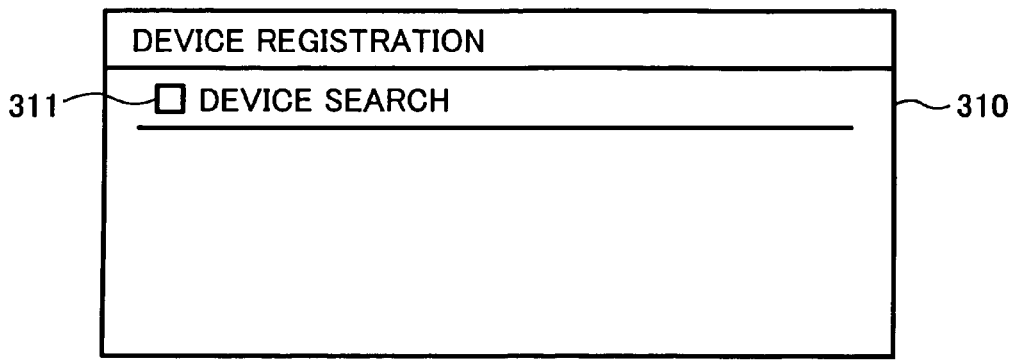
FIG. 21 is a diagram showing an example of a device-registration screen displayed in the process shown in FIGS. 20A, 20B.

FIG. 21 is a diagram showing an example of the device-registration-screen 310. The device-registration-screen 310 includes the device search button 311 to search for other devices with which the intermediate device 50 can perform intermediate communication. Although not shown in FIG. 21, IDs to specify the intermediate device 50 may be shown in the screen.

Referring back to FIG. 20, when the user clicks on the device search button 311 in the device-registration screen 310, the user interface 80 sends the event to the intermediate device 50 (S225).

In response to the event, the intermediate device 50 sends a device searching request (S226). The device searching request may be sent out and responses may be received from a certain network or a certain range of IP addresses in a network as a unicast or a broadcast because what devices exist in the network is unknown.

In this embodiment, the managed device 10 that receives the device searching request determines whether the managed device 10 is not registered and can be intermediated by the intermediate device 50 that sent the device searching request (S227). Therefore, the managed device 10 sends the device searching response with the ID of the managed device 10 to the intermediate device 50 (S228). The intermediate device 50 may also receive the device searching responses from other devices that can be intermediated by the intermediate device 50.

Then, the intermediate device 50 generates data of the search-result screen based on the received device searching responses and sends the data to the user interface 80 (S229), and the user interface 80 displays the screen (S230).

Figure 22:
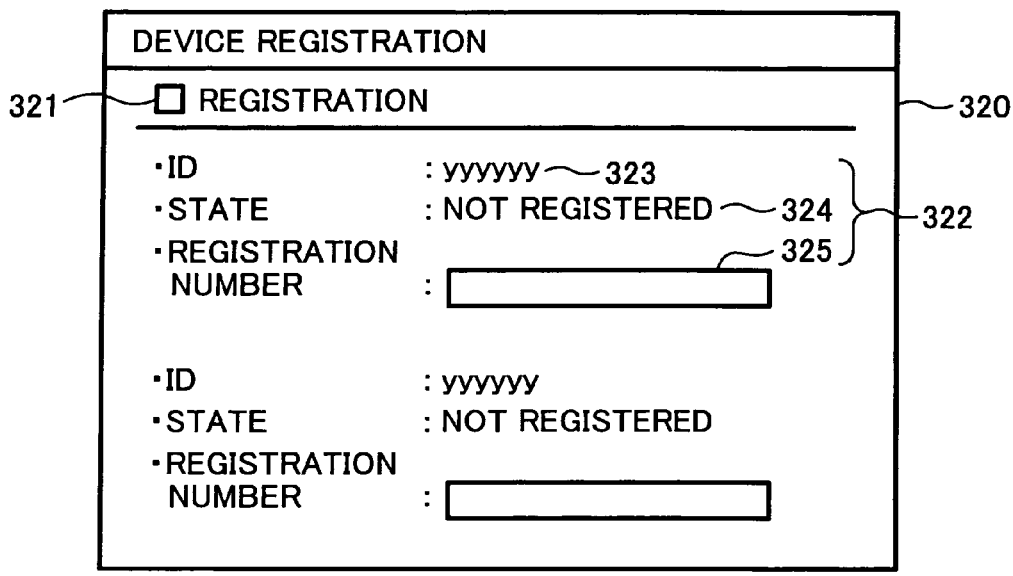
FIG. 22 is a diagram showing an example of a search-result screen displayed in the process shown in FIGS. 20A, 20B.

FIG. 22 is a diagram showing an example of the search-result-screen 320.

The search-result-screen 320 includes a registration button 321 and a device information display area 322 for displaying information on the discovered devices. The device information area 322 includes an ID area 323 for displaying IDs of the discovered devices, state area 324 for displaying present states of the discovered devices, and a registration inputting area 325 for a user to input the registration number that is informed from a service provider beforehand. As for the registration number, as well as the case of direct management, a contract number of the remote management contract or the like may be applied.

The registration button 321 is a button for the user to give an instruction of registration to the intermediate device 50. After the user inputs information in the registration number inputting area 324 and when the registration button 321 is clicked on, the intermediate device 50 sends a registration request of the managed device 10, for which the registration number was input, to the managing device 20.

Referring back to the sequence, when the user inputs the registration number the user requests to register and clicks on the registration button 321 in the search-result-screen 320, and the user interface 80 sends the event with the inputted registration number to the intermediate device 50 (S231).

In response to the event, the intermediate device 50 sends the registration request to the managing device 20 with the received registration number (S232). In addition, at this point, the managing device 20 does not certify the managed device (indirect-managed device) 10. Therefore, the intermediate device 50 also sends the information on the managed device 10. And the managing device 20 conducts a referring process and a registration process as well as step S111 and step S112 in FIG. 17 (S233, S234) and sends a registration response indicating a result of the process (S235).

If the registration is successful, the intermediate device 50 sends the registration notification indicating a success to the registered managed device 10 (S236). And the managed device 10 that receives the response turns the registration flag on. On the other hand, the managed device 10 leaves the intermediating function flag off. And the managed device 10 sets a necessary setting for communicating with the intermediate device 50, and transitions to the indirect-managed-state (S237) and sends a registration notification response to the intermediate device 50 (S238).

The process described above allows the managed device 10 to be in the indirect-managing-state where the managed device 10 communicates with the managing device 20 via the intermediate device 50.

In addition, in a case that a plurality of registration numbers are input in step S321, the intermediate device 50 repeats the steps from step S232 to step S238 for each one of the input devices. And when the intermediate device 50 receives all the registration responses from the managed devices 10, the intermediate device 50 sends data of a registration-result screen to the user interface 80 (S239) and the user interface 80 displays the screen (S240).

Figure 23:
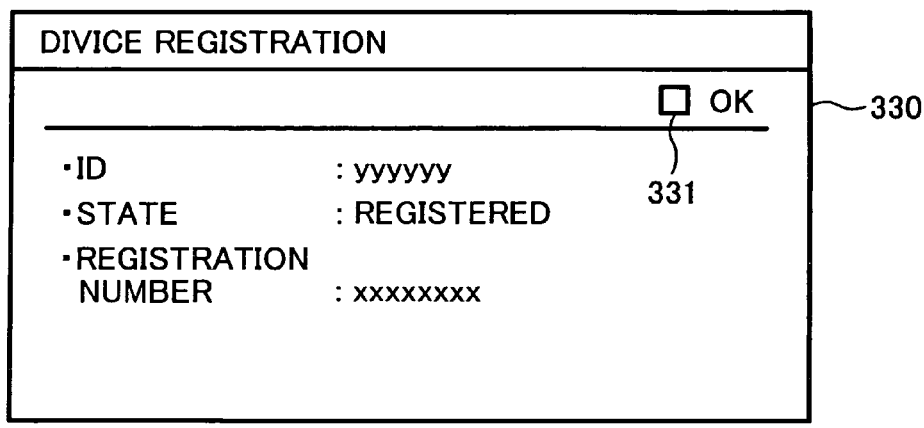
FIG. 23 is a diagram showing an example of a registration-result screen displayed in the process shown in FIGS. 20A, 20B.

FIG. 23 is a diagram showing an example of the registration-result-screen 330. The registration-result-screen 330 is a screen to inform the user of the completion of the registration for the managing device 20. In the registration-result-screen 330, if the user clicks on OK button 331, the registration process ends.

The process above described allows for devices that are not yet registered for the managing device 20 to be newly connected to a network and registered via the intermediate device 50.

In addition, in this embodiment, the managed devices 10 that are already registered for the managing device 20 as direct-managing objects do not send responses to the searching request even if the managed devices 10 are connected to the network in a state where the managed devices 10 can communicate with the intermediate device 50. Accordingly, this can prevent double registration of the managed devices 10 that are also registered as direct-managing-objects.

Figure 24A:
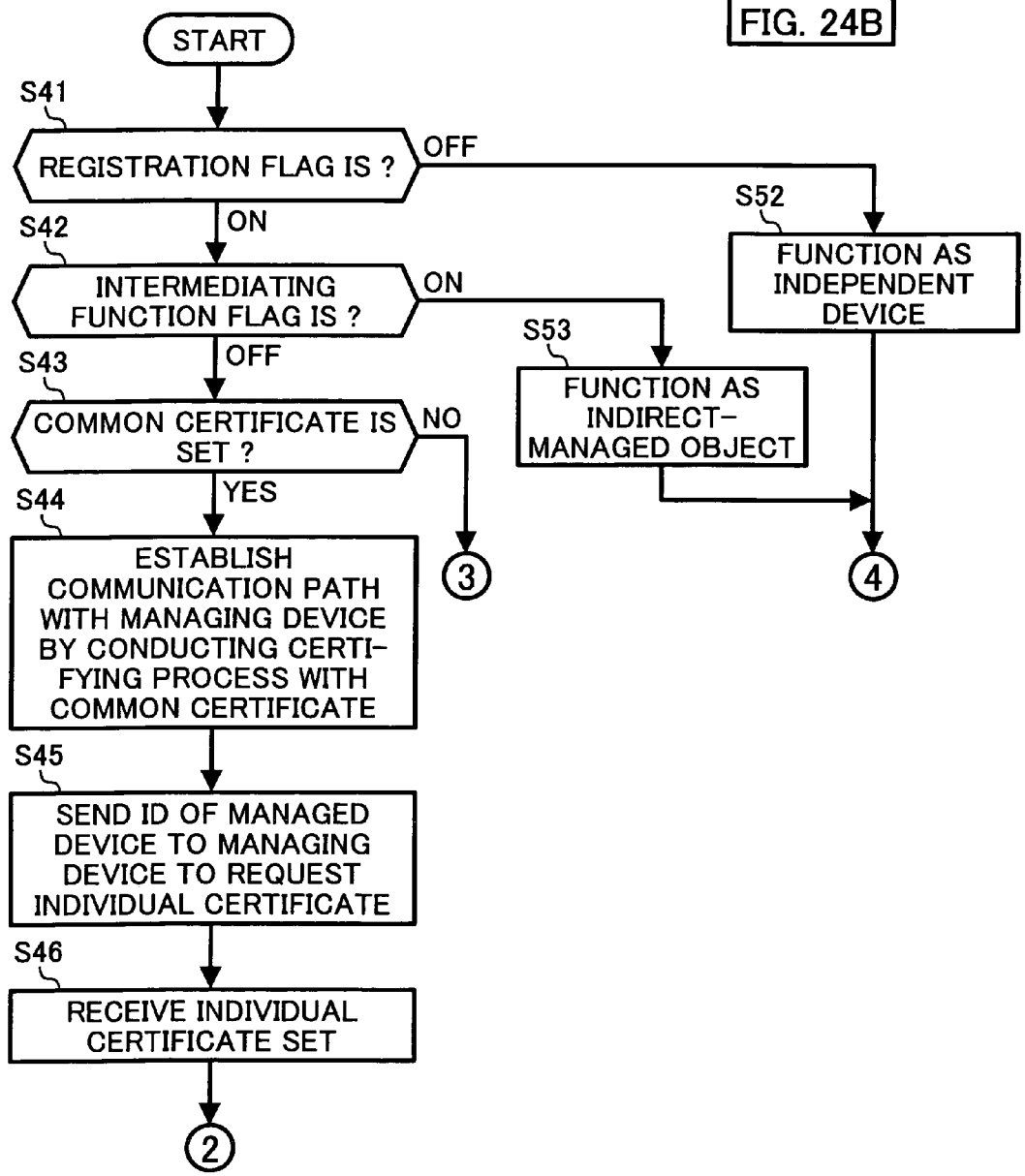
Figure 24B:
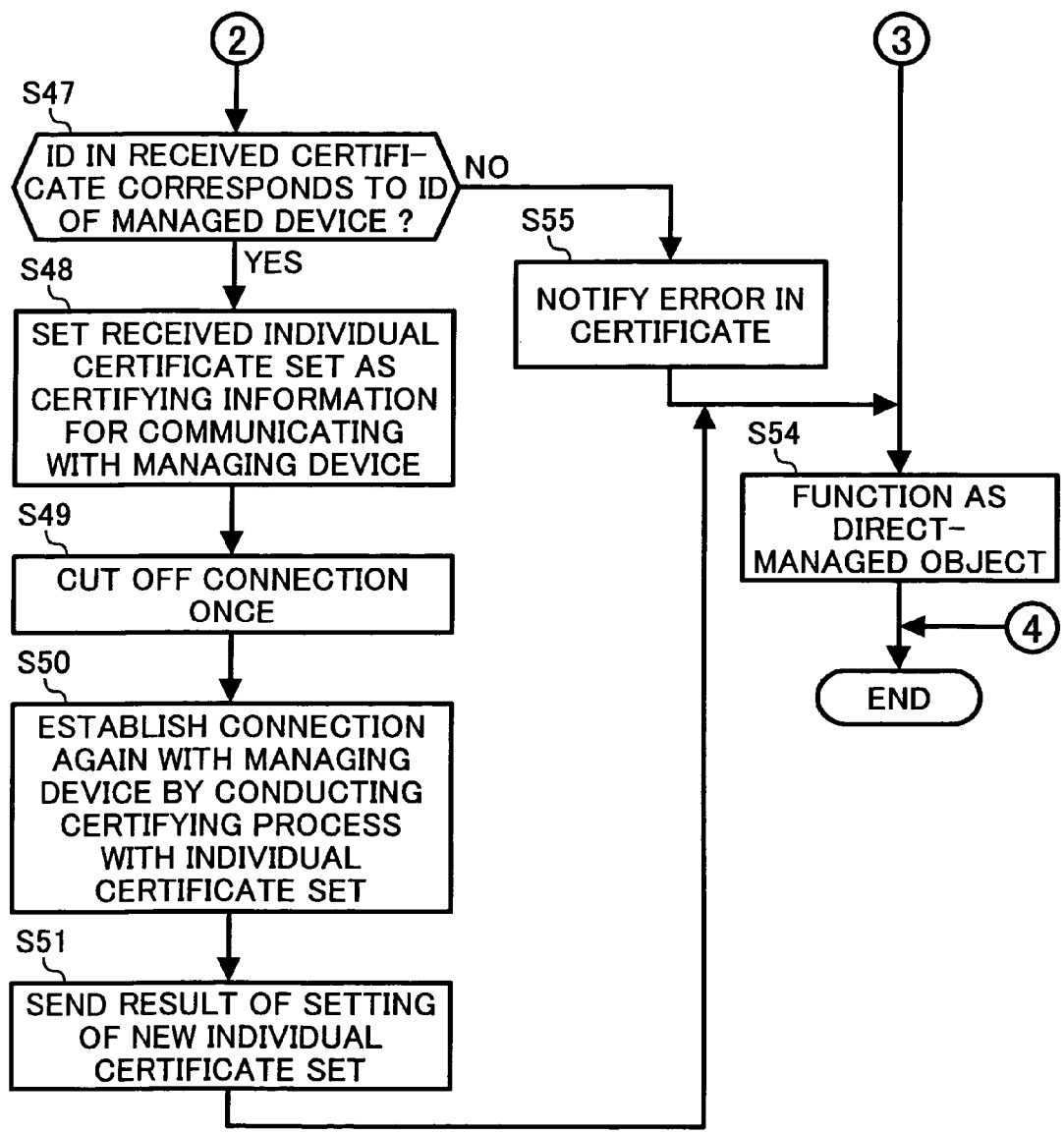

Next, FIG. 24 (FIGS. 24A, 24B) is a flowchart showing a process conducted by the managed device 10 when the managed device 10 turns on. The process shown in FIG. 24 includes a process where the managed device 10 attempts to obtain the individual certificate again when the managed device 10 turns on after the managed device 10 failed to obtain the individual certificate in the registration process described above.

The CPU 101 in the managed device 10 starts the process shown in the flowchart in FIG. 24 when the managed device 10 turns on.

In step S41, the CPU 101 refers to the registration flag and if the registration flag is on (registered), the process advances to step S42. In step S42, the CPU 101 refers to the intermediating function flag and if the intermediating function flag is off (not available), the process advances to step S43. In this case, the managed device 10 validates the direct-managed function.

In step S43, it is determined whether the certificate set as the certifying information for communicating with the managing device 20 is a common certificate without the ID of the managed device 10 or not. If the certificate is the common certificate, the process advances to step S44. In steps from step S44 to step S51, the managed device 10 obtains and sets the individual certificate set from the managing device 20 generally similarly to the steps from step S26 to step S32 in FIG. 10. After that, the managed device 10 transitions to the direct-managed state and starts functioning as a direct-managing object in step S54.

In this embodiment, the managed device 10 transitions to the direct-managed state after notifying an error to the user in step S55 even if the ID does not correspond to the ID of the managed device 10 in step S47. However, it may be applied that, in such a case, the managed device 10 is not managed by the managing device 20 until the managed device 10 obtains the certificate.

On the other hand, if the certificate is not the common certificate (that is, the certificate is the individual certificate) in step S43, the managed device 10 functions as a direct-managed object in step S54 because there is no need to obtain the individual certificate.

In addition, if the intermediating function flag is on (available) in step S42, then the process advances to step S53 and the managed device 10 functions as an indirect-managed object in step S53.

Moreover, if the registration flag is off (not registered) in step S41, then the process advances to step S52 and the managed device 10 functions as an independent device that is not managed by the managing device 20.

The process in steps from step S52 to step S54 continue until the managed device 10 turns off or is reactivated and contain a process such as detecting various events or performing a process according to the events.

Figure 25B:
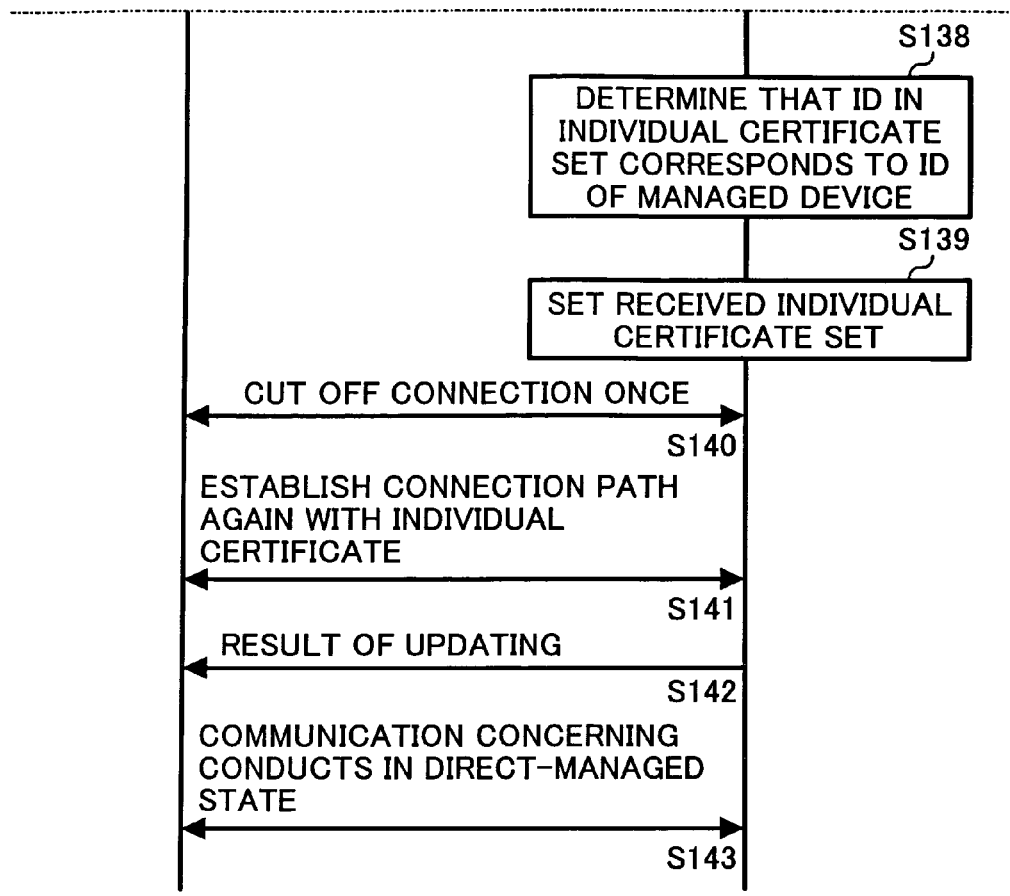

FIG. 25 (FIGS. 25A, 25B) is a diagram showing an example of a sequence in a case that the managed device 10 obtains the individual certificate from the managing device 20, which corresponds to the process shown in FIG. 24.

As shown in FIG. 25, the process is generally similar to the process explained with reference to FIG. 17 and FIG. 18

That is, if the managed device 10 determines that the direct-managed function should be valid according to the flags (S131) and determines that the common certificate is set in the managed device 10 (S132), the managed device 10 establishes the connection between the managing device 20 with the common certificate (S133). And the managed device 10 obtains the individual certificate from the managing device 20 and sets the individual certificate as well as the steps from step S116 in FIG. 17 to step S124 in FIG. 18 (from S134 to S142).

After setting the individual certificate, the managed device 10 functions as a direct-managed device and communicates with the managing device 20 via the connection established by the individual certificate (S143).

Meanwhile, there is a need for deregistration of the managed devices 10 for a user's convenience, such as for the rearrangement of managed devices 10, for an expiration of a contract, or the like. In these cases, the registration in the managing device 20 is canceled and at the same time the corresponding process is conducted in the managed device 10 side by one of the managed functions.

Figure 26:
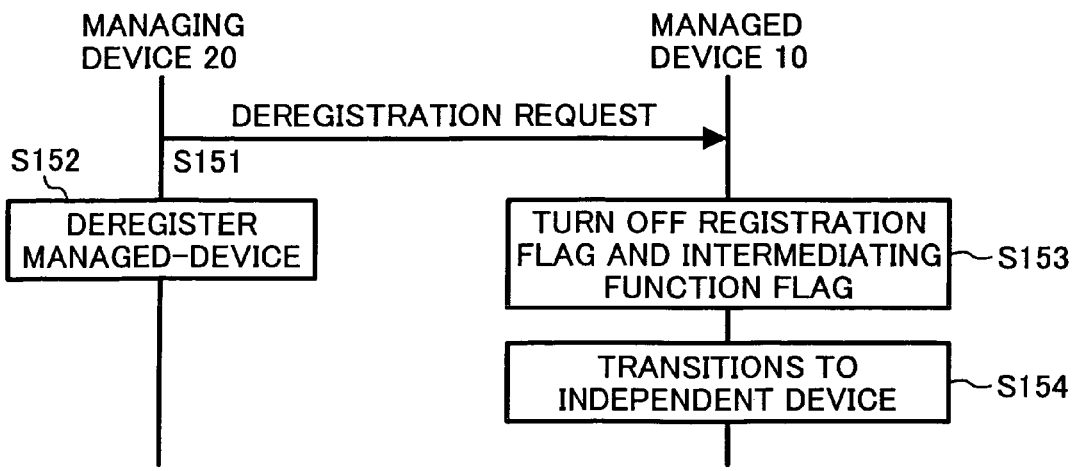
FIG. 26 is a diagram showing an example of a sequence in a case that the managing device deregisters the managed device, corresponding to the process shown in FIGS. 24A, 24B.

FIG. 26 is a diagram showing an example of a sequence in such a deregistration process.

In cases that the managed device 10 requests deregistration for the managing device 20 according to a user operation or that the managing device 20 side determines that the managed device 10 should be deregistered, the managing device 20 sends a deregistration request to the managed device 10 (S151). Then, the managed device 10 deregisters (S152).

On the other hand, the managed device 10 side turns off the registration flag and the intermediating function flag in response to the deregistration request (S153). And then the managed device 10 transitions to the independent device (S1154). In addition, the managed device 10 may reactivate itself and conduct the process shown in FIG. 24.

The process described above allows deregistering the managed device 10 once registered for the managing device 20 as a managing object. However, it is not necessary to delete the individual public key certificate set in the managed device 10 because the managed device 10 with the individual certificate can communicate with the managing device 20 with the individual certificate without obtaining a new certificate after the managed device 10 is registered again as a direct-managing-object. However, it may also be required to obtain a new individual certificate in registering once more.

In addition, in a case of deregistration of the indirect-managing-object, the process is generally similar to the case of deregistration of the direct-managing-object. However, the intermediate device 50 intermediates the communication between the managed device 10 and the managing device 20 and the intermediate device 50 also deregisters the managed device 10.

According to this embodiment, the managed device 10 obtains the individual certificate with the ID of the managed device 10 when the managed device 10 in the direct-managed state determines that the certificate set as the certifying information for communicating with the managing device 20 is the common certificate without the ID of the managed device 10. Accordingly, the individual certificate that is more secure than the common certificate is obtained automatically by the managed device 10 in a case that the managed device 10 determines that a more secure connection is necessary, even if the common certificate that is easier to set in the managed device 10 was set in the beginning. In addition, in a case that the managed device 10 functions just as an indirect-managed-device, it is not necessary to obtain an individual certificate to communicate with the managed device 20. Accordingly, this allows improving efficiency of maintaining security in the managed device 10 and in the management system.

Moreover it is possible to automatically keep the managed device 10 enabled to communicate with the individual certificate by automatically obtaining the individual certificate without a user operation for setting a certificate.

In addition, the individual certificate is obtained in the state of being encrypted via the connection established with the common certificate. Accordingly, this allows preventing of spoofing the individual certificate.

In addition, the managed device 10 sends the ID of the managed device 10 to the managing device 20 in obtaining the individual certificate. This allows the managing device 20 to prepare the proper certificate easily to be set in the managed device 10.

Moreover, the managing device 20 certifies the ID of the managed device 10 received from the managed device 10, and in a case that certification of the received ID succeeds, the managing device 20 sends the individual certificate to the managed device 10. This allows the managing device 20 to be prevented from sending the certificate to a different device.

In addition, the managed device 10 determines that there is an error in a case that the ID sent to the managing device 20 does not correspond to the ID in the individual certificate received from the managing device 20. This allows the managed device 10 to be prevented from setting an inappropriate certificate and making it impossible to conduct a further certification process.

Moreover, the managed device 10 obtains the individual certificate when the managed device 10 receives the affirmative response from the managing device 20, which means that the managing device 20 allows the managed device 10 to be registered as a managing object. This allows the managed device 10 to be prevented from attempting to obtain the individual certificate when it is impossible to obtain the individual certificate.

In addition, in this embodiment, the managed device 10 does not turn on the direct-managed function while the indirect-managed function is valid. This prevents complicated management in the managing device 20 side by the managed device 10 communicating with the managing device 20 via two different communication paths at the same time.

The present invention is not limited to the specifically disclosed embodiments, and variations and modifications may be made without departing from the spirit of the disclosure or from the scope of the appended claims.

For example, elements and/or features of different embodiments may be combined with each other and/or substituted for each other within the scope of the disclosure and the appended claims.

In addition, the firewall 60 between the managing device 20 and the managed devices 10 is not necessary.

Figures 28, 28A, 28B:
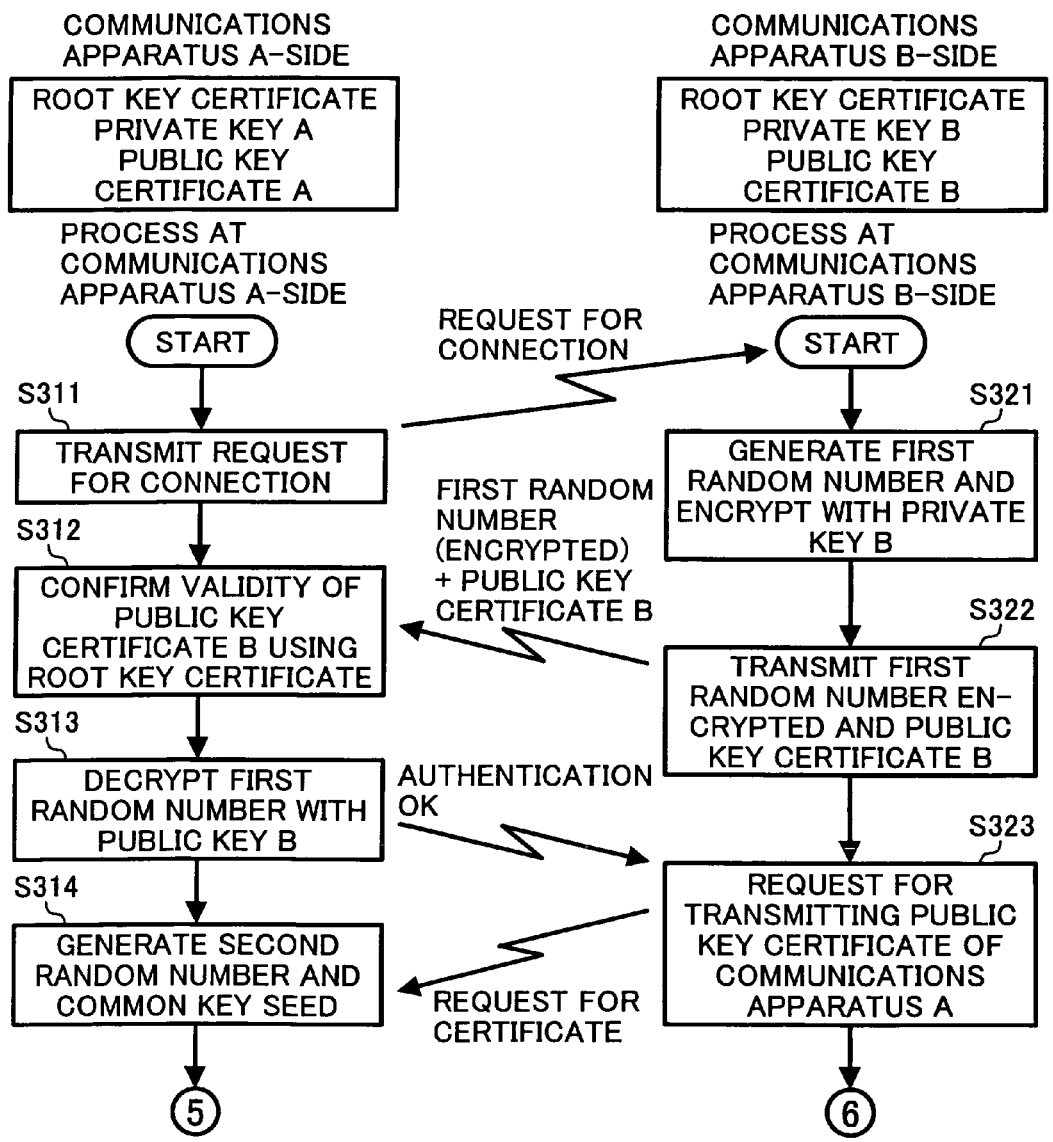
Figure 28B:
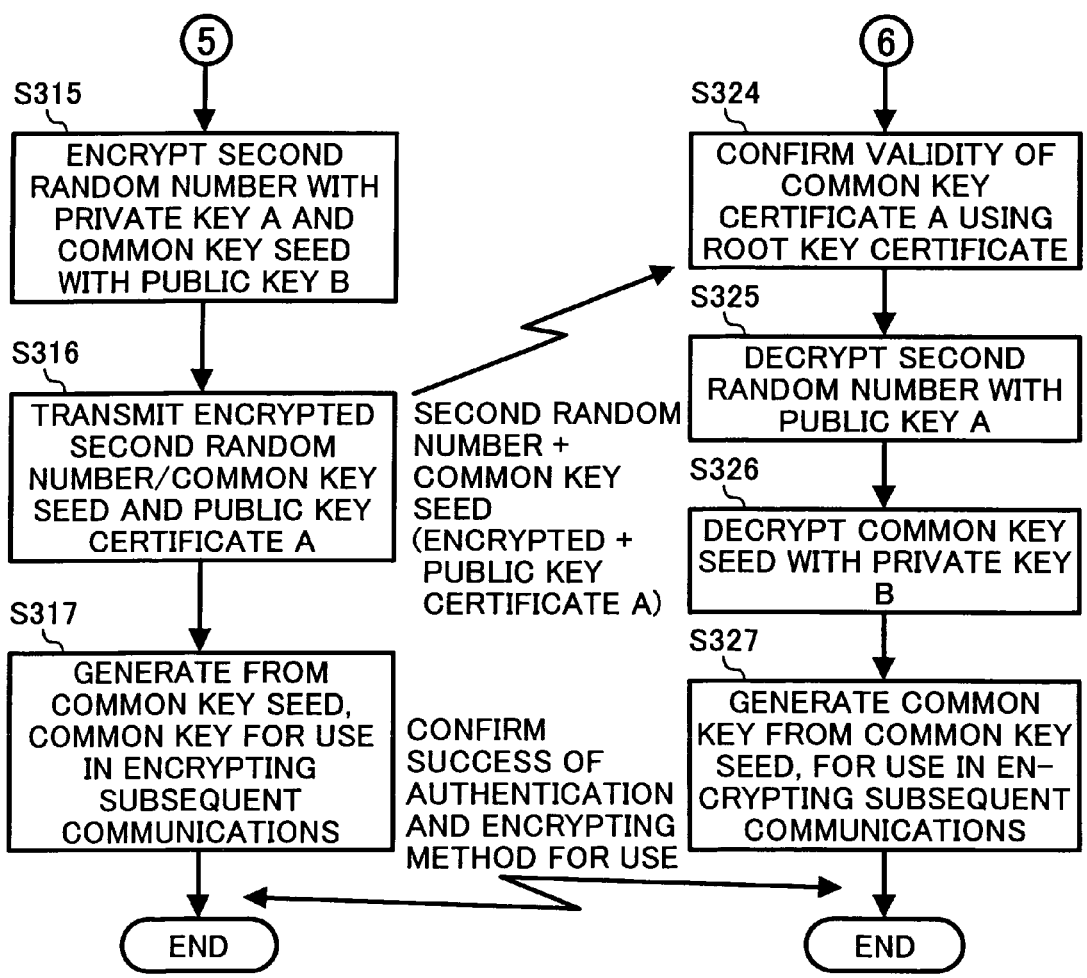
Figure 29B:
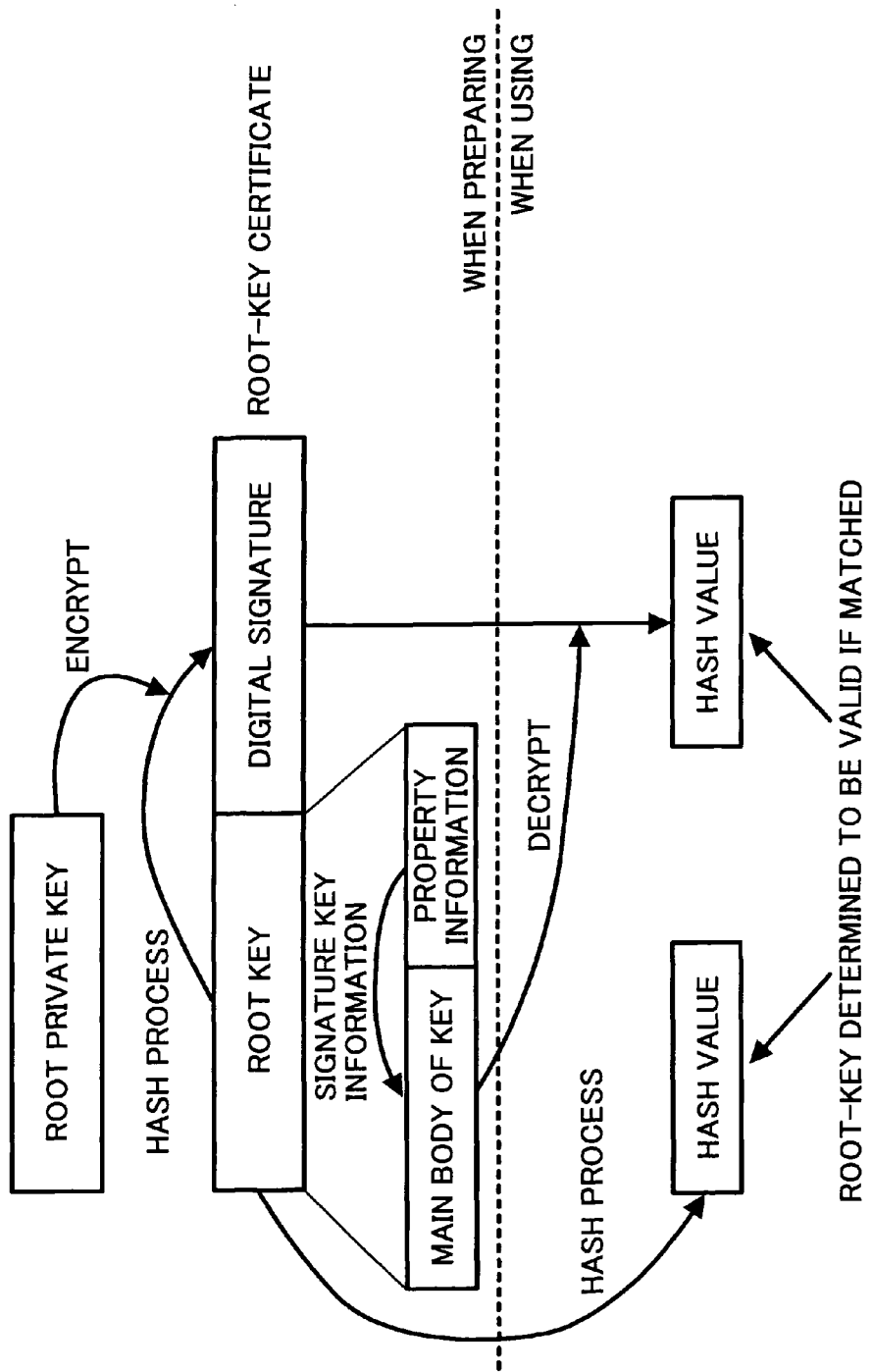

Moreover, instead of step S25 in FIG. 10 or step S43 in FIG. 24, the managed device 10 may determine whether the individual certificate with the ID of the managed device 10 is set or not, and if the individual certificate is not set, the managed device 10 may attempt to obtain the individual certificate. Furthermore, a unilateral certification may be applied to the certification process between the managed devices 10 and the managing device 20 instead of the cross certification described above with reference to FIG. 28.

In addition, identifiers other than the serial number of the managed device 10 may be applied, such as a specialized identifier for a certification. Moreover, an arbitrary communication line or protocol may be applied such as a fixed line, a wireless, VPN (virtual private network), PPP (point to point protocol), or the like.

Furthermore, the system including the managed devices 10 and the managing device 20 may have an arbitrary objective or relationship among respective devices. For example, the system may be configured to share the processing load. In addition, it is not necessary to store information on the managed devices 10 in the managing device 20 or the intermediate devices 50.

Figure 27:
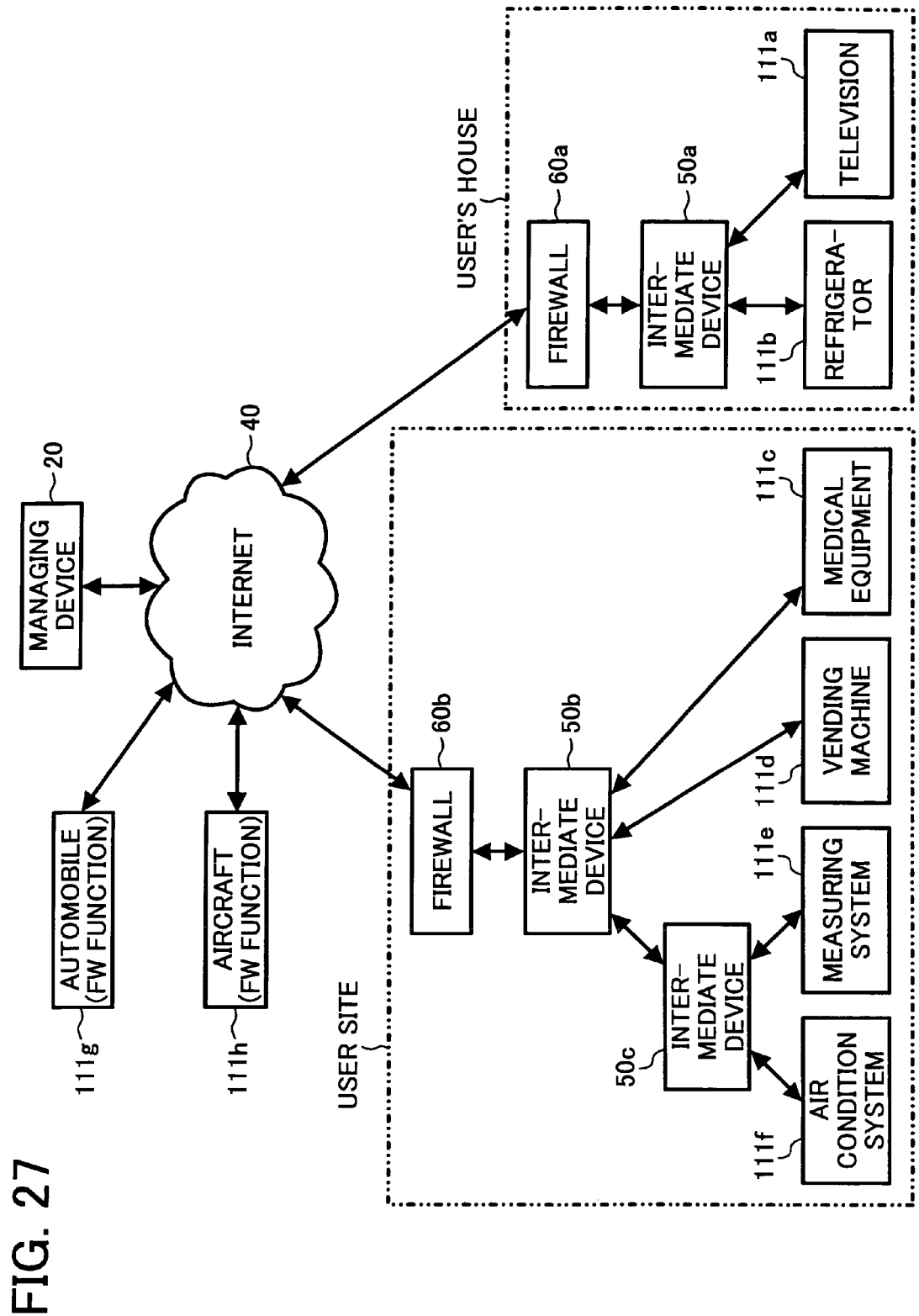
FIG. 27 is a diagram showing another example of the remote management system including the managed device shown in FIG. 1.

Moreover, the remote management system described above with reference to FIG. 1 may be configured with various communication devices as managed devices 10. FIG. 27 is a diagram showing another example of the remote management system configured with various communication devices as managed devices. In FIG. 27, the communication devices as the managed devices in the indirect-managed state are, for example, network home appliances such as a television 111a or a refrigerator 111b, medical equipment 111c, a vending machine 111d, a measuring system 111e, an air conditioning system 111f. On the other hand, the communication devices as the managed devices in the direct-managed state are, for example, an aircraft 111g and an automobile 111h. Additionally, it is preferable that the apparatuses that move in the wide area such as the aircraft 111g and the automobile 111h are provided with firewall functions.

Of course, this embodiment can be applied to the communication system or the communication devices above.

Moreover, a program according to the disclosure may be a program for causing a computer to function as the data processing apparatus managing device 20 described above. The program is executed by the computer and the above-described effects can be obtained.

This program may be stored beforehand in a storing part such as a ROM, an HDD, and the like, mounted to the computer. Alternatively, the program may be recorded in a nonvolatile recording medium (memory) such as a CD-ROM, a flexible disk, an SRAM, an EEROM, a memory card, and the like, to provide the program to the computer. By causing the computer to read out the program from the memory and execute the program, each of steps described above in the embodiments can be conducted.

Furthermore, by connecting to a network and downloading the program from an external device mounting the recording medium recording the program or an external device recording the program in a recording part, each of steps described above in the embodiments can be conducted.

The present application is based on the Japanese Priority Applications No. 2005-038883 filed on Feb. 16, 2005 and No. 2005-371139 filed on Dec. 23, 2005, the entire contents of each of which are hereby incorporated herein by reference.

The invention claimed is:

1. A managed device comprising:
   a managed part, having a CPU, (1) being directly managed by a managing device via a communication line, or (2) being indirectly managed by the managing device via a communication line and an intermediate device;
   a requesting part configured to request a registration of an intermediating function flag to the managing device, the intermediating function flag indicating whether the managed device uses an intermediating function of the managed device;
   a receiving part configured to receive the result as to whether the intermediating function flag is registered;
   a checking part configured to check whether the managed device has a common certificate set or not;
   a sending part configured to send an ID of the managed device to the managing device to request an individual certificate when it is determined that the managed device has the common certificate set; and a setting part configured to receive the requested individual certificate and to set the received individual certificate.

2. The managed device as claimed in claim 1, wherein said managed part includes, when being directly managed, a part to be certified by the managing device and to be managed by the managing device by communicating with the managing device; and said managed part includes, when being indirectly managed, a part to be certified by the intermediate device and to be managed by the managing device by communicating with the managing device via the intermediate device.

3. The managed device as claimed in claim 1, further comprising:

a determining part determining an error in a case that the ID sent to the managing device by said sending part does not correspond to an ID in the individual certificate obtained by said setting part.

4. The managed device as claimed in claim 1, wherein said managed part is not validated for direct management while said managed part is valid for indirect management.

5. The managed device as claimed in claim 1, further comprising an instruction input part to input an instruction to request registration to the intermediate device, and if registration is approved by the managing device, to receive a result of the approving and to set the intermediating function flag off, to thereby transition to an indirect-managed-state.

6. A management system comprising: a managing device; and a managed device including a managed part, having a CPU, (1) being directly managed by a managing device via a communication line, or (2) being indirectly managed by the managing device via a communication line and an intermediate device;

a requesting part configured to request a registration of an intermediating function flag to the managing device, the intermediating function flag indicating whether the managed device uses an intermediating function of the managed device;

a receiving part configured to receive the result as to whether the intermediating function flag is registered;

a checking part configured to check whether the managed device has a common certificate set or not;

a sending part configured to send an ID of the managed device to the managing device to request an individual certificate when it is determined that the managed device has the common certificate set; and a setting part configured to receive the requested individual certificate and to set the received individual certificate.

7. The management system as claimed in claim 6, wherein said managed part includes, when being directly managed, a part to be certified by the managing device and to be managed by the managing device by communicating with the managing device; and said managed part includes, when being indirectly managed, a part to be certified by the intermediate device and to be managed by the managing device by communicating with the managing device via the intermediate device.

8. The management system as claimed in claim 6, wherein said managing device includes a part to send the individual certificate in a case that a certification of the ID sent by the managed device succeeds.

9. The management system as claimed in claim 6, wherein said managed device includes a determining part determining an error in a case that the ID sent to the managing device by sending part does not correspond to an ID in the individual certificate obtained by setting part.

10. The management system as claimed in claim 6, wherein said managed part is not validated for direct management while said managed part is valid for indirect management.

11. The management system as claimed in claim 6, the managed device further comprising an instruction input part to input an instruction to request registration to the intermediate device, and if registration is approved by the managing device, to receive a result of the approving and to set the intermediating function flag off, to thereby transition to an indirect-managed-state.

12. A method for controlling a managed device including a managed part, having a CPU, (1) being directly managed by a managing device via a communication line, or (2) being indirectly managed by the managing device via a communication line and an intermediate device, the method comprising:

requesting a registration of an intermediating function flag to the managing device, the intermediating function flag indicating whether the managed device uses an intermediating function of the managed device;

receiving the result as to whether the intermediating function flag is registered; checking whether the managed device has a common certificate set or not; sending an ID of the managed device to the managing device to request an individual certificate when it is determined that the managed device has the common certificate set; and receiving the requested individual certificate and setting the received individual certificate.

13. The method as claimed in claim 12, wherein said managed part includes, when being directly managed, a part to be certified by the managing device and to be managed by the managing device by communicating with the managing device; and said managed part includes, when being indirectly managed, a part to be certified by the intermediate device and to be managed by the managing device by communicating with the managing device via the intermediate device.

14. The method as claimed in claim 12, further comprising: determining an error in a case that the ID sent to the managing device by said sending does not correspond to the ID in the individual certificate obtained by said setting.

15. The method as claimed in claim 12, wherein said managed part is not validated for direct management while said managed part is valid for indirect management.

16. The method as claimed in claim 12, further comprising inputting an instruction to request registration to the intermediate device, and if registration is approved by the managing device, receiving a result of the approving and setting the intermediating function flag off, to thereby transition to an indirect-managed-state.

17. A computer-readable recording medium recorded with a program of computer executable instructions executable by a computer to control a managed device including a managed part (1) being directly managed by a managing device via a communication line, or (2) being indirectly managed by the managing device via a communication line and an intermediate device, said program comprising:

first computer executable instructions for requesting a registration of an intermediating function flag to the managing device, the intermediating function flag indicating whether the managed device uses an intermediating function of the managed device;

second computer executable instructions for receiving the result as to whether the intermediating function flag is registered;

third computer executable instructions for checking whether the managed device has a common certificate set or not;

fourth computer executable instructions for sending an ID of the managed device to the managing device to request an individual certificate when it is determined that the managed device has the common certificate set; and fifth computer executable instructions for receiving the requested individual certificate and setting the received individual certificate.

18. The computer readable medium as claimed in claim 17, further comprising sixth computer executable instructions for inputting an instruction to request registration to the intermediate device, and if registration is approved by the managing device, receiving a result of the approving and setting the intermediating function flag off, to thereby transition to an indirect-managed-state.

* * * * *